(12) United States Patent
Peng

(10) Patent No.: US 10,750,223 B2
(45) Date of Patent: Aug. 18, 2020

(54) SYSTEM, METHOD, AND DEVICE FOR DISPLAYING CONTENT ITEM

(71) Applicant: TENCENT TECHNOLOGY (SHENZHEN) COMPANY LIMITED, Shenzhen (CN)

(72) Inventor: Ao Peng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 158 days.

(21) Appl. No.: 15/645,660

(22) Filed: Jul. 10, 2017

(65) Prior Publication Data
US 2017/0311021 A1     Oct. 26, 2017

Related U.S. Application Data

(63) Continuation of application No. PCT/CN2016/077240, filed on Mar. 24, 2016.

(30) Foreign Application Priority Data

Apr. 3, 2015   (CN) .......................... 2015 1 0158214

(51) Int. Cl.
*H04N 21/2668* (2011.01)
*H04N 21/4725* (2011.01)
(Continued)

(52) U.S. Cl.
CPC ..... *H04N 21/2668* (2013.01); *H04N 21/4307* (2013.01); *H04N 21/4725* (2013.01);
(Continued)

(58) Field of Classification Search
CPC .................................................. H04N 21/2668
(Continued)

(56) References Cited

U.S. PATENT DOCUMENTS

| 8,806,206 B2* | 8/2014 | Li ..................... G06F 21/34 713/151 |
| 9,411,422 B1* | 8/2016 | McClendon ............ G06F 3/016 |

(Continued)

FOREIGN PATENT DOCUMENTS

| CN | 201491151 U | 5/2010 |
| CN | 103096147 A | 5/2013 |

(Continued)

OTHER PUBLICATIONS

Microsoft Computer Dictionary, "binding", 5th edition, 2002 (Year: 2002).*

(Continued)

*Primary Examiner* — Ondrej C Vostal
(74) *Attorney, Agent, or Firm* — Anova Law Group, PLLC

(57) ABSTRACT

The present disclosure provides a system, a method, and a device for displaying a content item. The system includes: a video playing terminal, configured to obtain a video and play the video; a content item displaying client, configured to send a content item obtaining request for requesting to obtain a content item related to the video being played by the video playing terminal; and a content item preparation platform, configured to determine a current playing moment of the video played by the video playing terminal, select, from one or more content items corresponding to the video, a content item with a marking moment nearest to the current playing moment, and push the selected content item to the content item displaying client, where the content item displaying client is further configured to display the received content item.

17 Claims, 13 Drawing Sheets

(51) Int. Cl.
  *H04N 21/8547* (2011.01)
  *H04N 21/478* (2011.01)
  *H04N 21/43* (2011.01)
  *H04N 21/81* (2011.01)

(52) U.S. Cl.
  CPC ..... *H04N 21/47815* (2013.01); *H04N 21/812* (2013.01); *H04N 21/8547* (2013.01)

(58) Field of Classification Search
  USPC .......................................................... 709/219
  See application file for complete search history.

(56) References Cited

U.S. PATENT DOCUMENTS

| | | | |
|---|---|---|---|
| 9,961,399 B2* | 5/2018 | Adimatyam | G11B 27/32 |
| 2004/0064529 A1* | 4/2004 | Meredith | H04L 69/329 |
| | | | 709/219 |
| 2005/0044197 A1* | 2/2005 | Lai | H04L 67/16 |
| | | | 709/223 |
| 2007/0011051 A1* | 1/2007 | Findlay | G06Q 30/02 |
| | | | 705/14.5 |
| 2007/0300261 A1* | 12/2007 | Barton | G06Q 30/0241 |
| | | | 725/58 |
| 2008/0091796 A1* | 4/2008 | Story | G06Q 30/0283 |
| | | | 709/217 |
| 2008/0120593 A1* | 5/2008 | Keren | G06F 9/451 |
| | | | 717/105 |
| 2008/0127179 A1* | 5/2008 | Moss | G06F 8/61 |
| | | | 717/175 |
| 2009/0099919 A1* | 4/2009 | Schultheiss | G06Q 10/00 |
| | | | 705/14.1 |
| 2009/0271472 A1* | 10/2009 | Scheifler | G06F 9/5072 |
| | | | 709/202 |
| 2010/0245361 A1* | 9/2010 | Ofek | G06Q 30/0241 |
| | | | 345/441 |
| 2011/0016504 A1* | 1/2011 | Story | H04N 5/76 |
| | | | 725/115 |
| 2011/0066498 A1* | 3/2011 | Wojcicki | G06Q 30/02 |
| | | | 705/14.55 |
| 2011/0225417 A1* | 9/2011 | Maharajh | G06F 21/10 |
| | | | 713/150 |
| 2012/0017240 A1 | 1/2012 | Shkedi et al. | |
| 2012/0210250 A1* | 8/2012 | Svendsen | G06Q 10/10 |
| | | | 715/753 |
| 2012/0254793 A1* | 10/2012 | Briand | G06F 3/048 |
| | | | 715/800 |
| 2012/0284290 A1* | 11/2012 | Keebler | G06F 16/958 |
| | | | 707/756 |
| 2013/0198642 A1* | 8/2013 | Carney | G06F 3/0484 |
| | | | 715/738 |
| 2014/0006559 A1* | 1/2014 | Drapeau | G06Q 30/0207 |
| | | | 709/217 |
| 2014/0006951 A1* | 1/2014 | Hunter | H04H 60/31 |
| | | | 715/719 |
| 2014/0012949 A1* | 1/2014 | Meyers | H04L 67/1095 |
| | | | 709/217 |
| 2014/0047072 A1* | 2/2014 | Shuster | H04N 21/25841 |
| | | | 709/219 |
| 2014/0101032 A1* | 4/2014 | Farhat | G06F 21/10 |
| | | | 705/39 |
| 2014/0156723 A1* | 6/2014 | Huang | H04L 67/02 |
| | | | 709/203 |
| 2014/0245346 A1* | 8/2014 | Cheng | H04N 21/812 |
| | | | 725/32 |
| 2015/0026583 A1* | 1/2015 | Anguiano | H04L 67/02 |
| | | | 715/738 |
| 2015/0033285 A1* | 1/2015 | Gao | H04L 63/0263 |
| | | | 726/1 |
| 2015/0205492 A1* | 7/2015 | Nobil | G06F 16/438 |
| | | | 715/716 |
| 2015/0245081 A1* | 8/2015 | Cook | H04N 21/44227 |
| | | | 725/81 |
| 2015/0248226 A1* | 9/2015 | Kumar | G06F 3/0483 |
| | | | 715/747 |
| 2015/0296171 A1* | 10/2015 | Lakkundi | G06F 1/1632 |
| | | | 386/200 |
| 2016/0019858 A1* | 1/2016 | Wang | A61B 5/0002 |
| | | | 345/520 |
| 2016/0119584 A1* | 4/2016 | Liao | H04N 7/152 |
| | | | 348/14.09 |
| 2016/0170712 A1* | 6/2016 | Luan | G06F 8/71 |
| | | | 717/121 |
| 2016/0205442 A1* | 7/2016 | Yee | G06Q 30/02 |
| | | | 725/34 |
| 2017/0039594 A1* | 2/2017 | Shaw | G06Q 30/0261 |
| 2017/0188085 A1* | 6/2017 | Li | H04N 21/4302 |
| 2017/0272824 A1* | 9/2017 | Bunner | H04N 21/4126 |
| 2018/0052587 A1* | 2/2018 | LaPier | G06F 3/0482 |
| 2018/0095655 A1* | 4/2018 | Mannopantar | G06F 3/04883 |

FOREIGN PATENT DOCUMENTS

| | | |
|---|---|---|
| CN | 103248917 A | 8/2013 |
| CN | 103533399 A | 1/2014 |
| CN | 103618956 A | 3/2014 |
| CN | 103703789 A | 4/2014 |
| CN | 104185040 A | 12/2014 |
| CN | 104796743 A | 7/2015 |

OTHER PUBLICATIONS

Webopedia, "bind", 2020 (Year: 2020).*
Wikipedia, "binding", 2020 (Year: 2020).*
The State Intellectual Property Office of the People's Republic of China (SIPO) Office Action 2 for 201510158214.6 dated Feb. 24, 2018 12 Pages (including translation).
The World Intellectual Property Organization (WIPO) International Search Report for PCT/CN2016/077240 dated Jun. 30, 2016.
The State Intellectual Property Office of the People's Republic of China (SIPO) Office Action 1 for 201510158214.6 dated Jun. 23, 2017.

* cited by examiner

SYSTEM, METHOD, AND DEVICE FOR DISPLAYING CONTENT ITEM

RELATED APPLICATION

This application is a continuation application of PCT Patent Application No. PCT/CN2016/077240, filed on Mar. 24, 2016, which claims priority to Chinese Patent Application No. 2015101582146, entitled "SYSTEM, METHOD, AND DEVICE FOR DISPLAYING CONTENT ITEM" filed on Apr. 3, 2015, the entire contents of both of which are incorporated herein by reference.

FIELD OF THE TECHNOLOGY

Embodiments of the present invention relate to the field of Internet technologies, and in particular, to a system, a method, and a device for displaying a content item.

BACKGROUND OF THE DISCLOSURE

A video such as a television or a movie has become an indispensable information obtaining manner in people's daily life. A content item, such as advertising promotion, user interaction, vote collecting, quiz guessing, red packet reception, based on a video also increasingly enriches a video playing requirement of a user and a vendor.

Using a content item being an advertisement as an example, a data frame corresponding to the advertisement is added in a certain video. When a video playing terminal plays the video, if the data frame corresponding to the advertisement is played, the playing of the video pauses on a screen of the video playing terminal, and content of the data frame corresponding to the advertisement is played on the screen. When the data frame corresponding to the advertisement is played completely, the video content continues to be played.

During implementation of embodiments of the present invention, the inventor finds that the existing technology has at least the following problem: Because each content item is inserted into a video, playing of the content item needs to exclusively occupy a screen of a video playing terminal; consequently, a video that is being played must pause, which further affects a playing progress.

SUMMARY

In order to resolve a problem in the existing technology that because a content item is inserted into a video, playing of the content item needs to exclusively occupy a screen of a video playing terminal; consequently, a video that is being played must pause, which further affects a playing progress, embodiments of the present invention provide a system, a method, and a device for displaying a content item. The technical solutions are as follows:

According to a first aspect, a system for displaying a content item is provided. The system may include: a content item preparation platform, a video playing terminal, and a content item displaying client bound with the video playing terminal; the video playing terminal being configured to obtain a video from the content item preparation platform and play the video; the content item displaying client being configured to send, to the content item preparation platform, a content item obtaining request used for requesting to obtain a content item related to the video being played by the video playing terminal; the content item preparation platform being configured to: determine, when receiving the content item obtaining request, a current playing moment of the video played by the video playing terminal, select, from one or more content items corresponding to the video, a content item with a marking moment nearest to the current playing moment, and push the selected content item to the content item displaying client; and the content item displaying client being further configured to display the received content item.

According to a second aspect, a method for displaying a content item is provided. The method may include: obtaining, by a video playing terminal, a video from a content item preparation platform and playing the video; sending, by a content item displaying client, to the content item preparation platform, a content item obtaining request used for requesting to obtain a content item related to the video being played by the video playing terminal; determining, by the content item preparation platform, when receiving the content item obtaining request, a current playing moment of the video played by the video playing terminal, selecting, from one or more content items corresponding to the video, a content item with a marking moment nearest to the current playing moment, and pushing the selected content item to the content item displaying client; and displaying, by the content item displaying client, the received content item.

According to a third aspect, a content item preparation platform is provided. The content item preparation platform may include: one or more processors; and a memory; the memory storing one or more programs, the one or more programs being configured to be executed by one or more processors, and the one or more programs including instructions used for performing the following operations: receiving a content item obtaining request sent by a content item displaying client, the content item obtaining request being used for requesting to obtain a content item related to a video playing by a video playing terminal; determining a current playing moment of the video played by the video playing terminal bound with the content item displaying client; selecting, from one or more content items corresponding to the video, a content item with a marking moment nearest to the current playing moment; and pushing the selected content item to the content item displaying client, the content item triggering the content item displaying client to display the content item.

According to a fourth aspect, a method for displaying a content item applied to a content item preparation platform is provided. The method may include: receiving a content item obtaining request sent by a content item displaying client, the content item obtaining request being used for requesting to obtain a content item related to a video being played by a video playing terminal; determining a current playing moment of the video played by the video playing terminal bound with the content item displaying client; selecting, from one or more content items corresponding to the video, a content item with a marking moment nearest to the current playing moment; and pushing the selected content item to the content item displaying client, the content item triggering the content item displaying client to display the content item.

According to a fifth aspect, a content item displaying client is provided. The content item displaying client may include: one or more processors; and a memory; the memory storing one or more programs, the one or more programs being configured to be executed by the one or more processors, and the one or more programs including instructions used for performing the following operations: sending, to a content item preparation platform, a content item obtaining request used for requesting to obtain a content item related to a video being played by a video playing terminal, the content item obtaining request being used for triggering the content item preparation platform to: determine the video playing terminal bound with the content item displaying client, determine a current playing moment of the video played by the video playing terminal, select, from one or more content items corresponding to the video, a content item with a marking moment nearest to the current playing moment, and push the selected content item to the content item displaying client; and displaying the received content item.

According to a sixth aspect, a method for displaying content item is provided, applied to a content item displaying client, the method including: sending, to a content item preparation platform, a content item obtaining request used for requesting to obtain a content item related to a video that is being played by a video playing terminal, the content item obtaining request being used for triggering the content item preparation platform to determine the video playing terminal bound with the content item displaying client, determine a current playing moment of the video played by the video playing terminal, selecting, from each content item corresponding to the video, a content item with a marking moment nearest to the current playing moment, and push the selected content item to the content item displaying client; and displaying the received content item.

Beneficial effects brought by the technical solutions provided in the embodiments of the present invention may include the following.

A content item corresponding to a video is sent to a content item displaying client bound with a video playing terminal, thereby separating playing of the video from displaying of the content item, so that the content item displaying client displays the content item while the video playing terminal plays the video, thereby resolving the problem that because a content item is inserted into a video, playing of the content item needs to exclusively occupy a screen of a video playing terminal; consequently, a video that is being played must pause, which further affects a playing progress; and achieve effects of ensuring that the content item corresponding to the video is displayed while the video is played, and that impact of the content item for a video playing progress is avoided.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objective, technical solutions and advantages of the present disclosure clearer, the following further describes in detail implementation manners of the present disclosure with reference to the accompanying drawings.

System Environment

Figure 1:
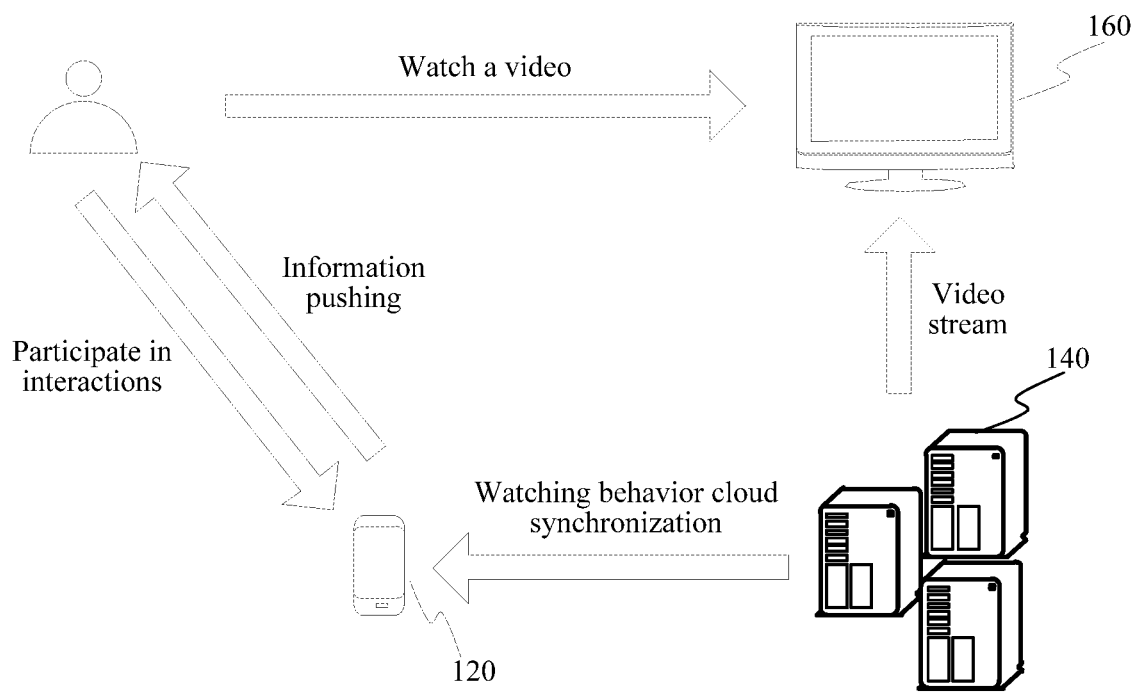
FIG. 1 is an architectural diagram of a system for displaying a content item according to an embodiment of the present invention.

FIG. 1 shows an architectural diagram of a system for displaying a content item according to an embodiment of the present invention. The system includes: at least one content item displaying client 120, a content item preparation platform 140, and at least one video playing terminal 160.

The content item displaying client 120 is an application (APP) provided by the content item preparation platform 140. The content item displaying client 120 may be a Weibo client, a blog client, a social application client, or another application client. The content item displaying client 120 may obtain, from the content item preparation platform 140, a content item, such as an advertisement, a voting, a topic discussion, corresponding to a video that is being played by the video playing terminal 160. The content item displaying client 120 generally needs to run on a mobile terminal used by a user, where the mobile terminal may be a smart phone, a tablet computer, a multimedia player, or the like.

The content item displaying client 120 is connected to the content item preparation platform 140 by using a wired network or a wireless network.

The content item preparation platform 140 is configured to send a video stream to the video playing terminal 160, and provide a server computer system of the content item to the content item displaying client 120. The content item preparation platform 140 generally is a cluster of multiple servers, and each server is configured to implement one or more functional modules. The content item preparation platform 140 may be a cluster of a background server system providing a video for playing and a background server system providing a content item. The background server system providing a content item may be a background server system of a Weibo client, a background server system of an instant chatting program, a background server system of a voice chatting program a background server system of a social application, or the like. These background server systems providing a content item are associated with a product management background server system, a voting configuration background server system, a red packet reception background server system, or another configuration background server system, to receive related information that is used for configuring a content item and that is provided by these configuration background servers.

The video playing terminal 160 may be a terminal with a video playing function. Preferably, the video playing terminal 160 may be a terminal with a network video on-demand request function, such as a smart television, a network television, a computer, or an electronic display screen that is installed on a wall body. The electronic display screen may be a display screen that is used for displaying related information and that is installed on a wall body in a public street, an office place, or another place.

Optionally, the video playing terminal 160 is bound with the content item displaying client 120, and the content item preparation platform 140 may learn a binding relationship between the video playing terminal 160 and the content item displaying client 120. In one example, a user may use a first account to log in for a video service (e.g., provided by the content item preparation platform 140) on the video playing terminal 160; the user may use the first account or a second account associated with the first account to log in for a service on the content item displaying client 120. That is, the content item preparation platform 160 may learn the biding relationship through the same or associated user account. In another example, before or during the video playing terminal 160 is playing the video, the video playing terminal 160 may provide an instruction (e.g., an QR code, a webpage link) for the content item displaying client 120 to establish the binding relationship. That is, the content item preparation platform 160 may learn the biding relationship when detecting that the content item displaying client 120 has followed the instruction and established the binding relationship.

Computer Architecture

Figure 2:
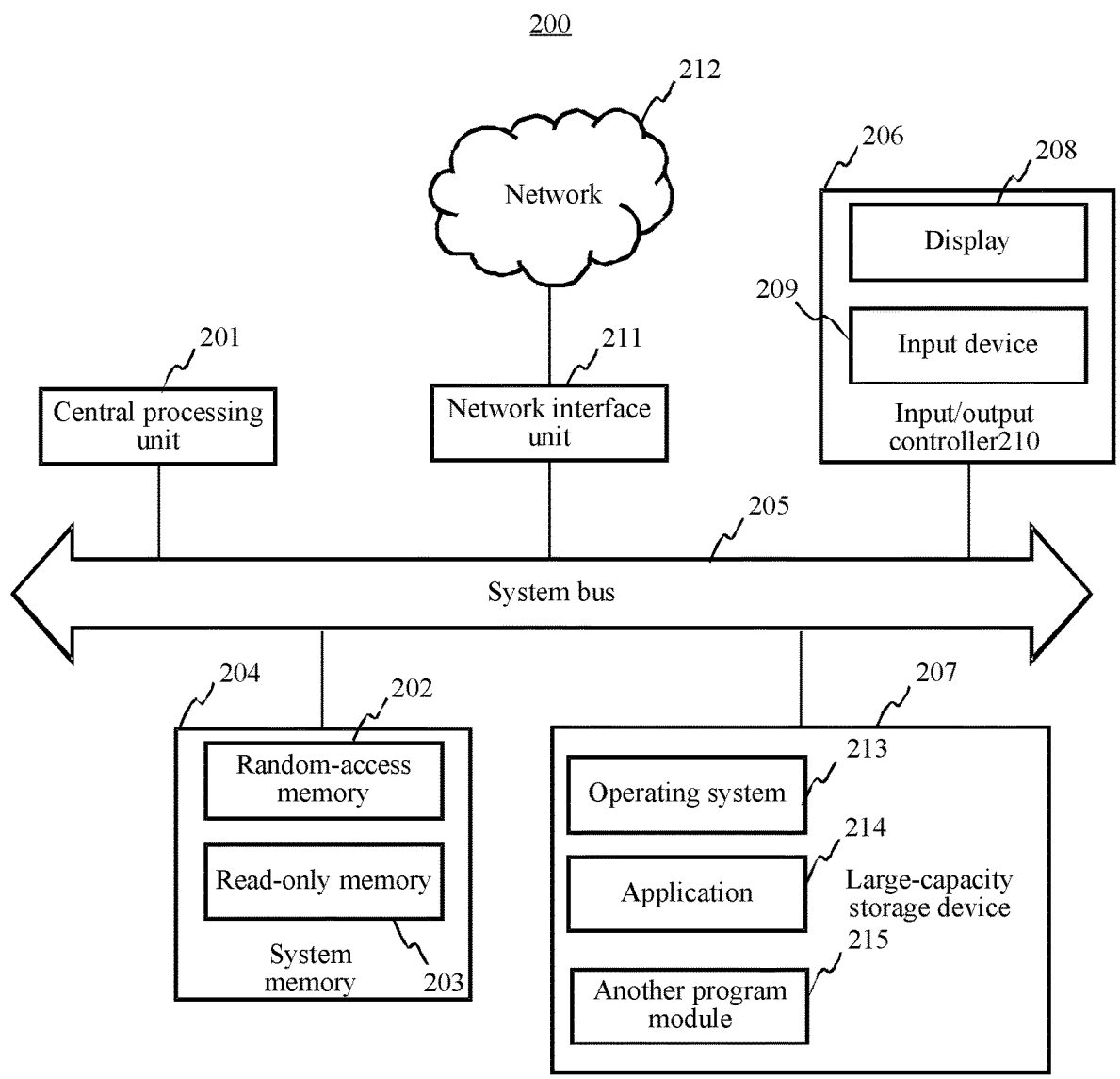
FIG. 2 is a schematic structural diagram of a server according to an embodiment of the present invention.

FIG. 2 shows a schematic structural diagram of a server according to an embodiment of the present invention. Optionally, the server 200 may be a server corresponding to the content item preparation platform 140, or a server in the content item preparation platform 140. Specifically:

The server 200 includes a central processing unit (CPU) 201, a system memory 204 including a random-access memory (RAM) 202 and a read-only memory (ROM) 203, and a system bus 205 connected to the system memory 204 and the central processing unit 201. The server 200 further includes a basic input/output (I/O) system 206 that helps to transmit information between components in a computer, and a large-capacity storage device 207 used for storing an operating system 213, an application 214, and another program module 215.

The basic I/O system 206 includes a display 208 configured to display information and an input device 209 configured to input information by a user, such as a mouse or a keyboard. Both the display 208 and the input device 209 are connected to the central processing unit 201 by using an input/output controller 210 connected to the system bus 205. The basic I/O system 206 may further include an I/O controller 210 configured to receive and process input from multiple other devices such as a keyboard, a mouse, or an electronic stylus. Similarly, the I/O controller 210 further provides output to a display screen, a printer, or other types of output devices.

The large-capacity storage device 207 is connected to the central processing unit 201 by using a large-capacity storage controller (not shown) connected to the system bus 205. The large-capacity storage device 207 and its associated computer readable medium provide non-volatile storage to the server 200. That is, the large-capacity storage device 207 may include a computer readable medium (not shown) such as a hard disk or a CD-ROM driver.

Without loss of generality, the computer readable medium may include a computer storage medium and a communications medium. The computer storage medium includes volatile and non-volatile, removable and non-removable media that are implemented by any method or technology and that are used for storing information such as a computer readable instruction, a data structure, a program module, or other data. The computer storage medium includes a static random access memory (SRAM), an electrically erasable programmable read-only memory (EEPROM), an erasable programmable read only memory (EPROM), a programmable read only memory (PROM), a RAM, a ROM, a flash memory, or another solid-state storage technology, a CD-ROM, a digital versatile disc (DVD) or another optical memory, a magnetic tape cartridge, a magnetic tape, a disk storage or another magnetic storage device. Certainly, a person skilled in the art may know that the computer storage medium is not limited to the foregoing several types. The system memory 204 and the large-capacity storage device 207 may be collectively referred to as a memory.

According to various embodiments of the present invention, the server 200 may further be connected, by using a network such as the Internet, to a remote computer on the network for running. That is, the server 200 may be connected to a network 212 by connecting to a network interface unit 211 on the system bus 205, or may be connected to a network of another type or a remote computer system (not shown) by using a network interface unit 211.

The system bus 205 may further be replaced with another connection manner.

The memory further includes one or more programs, configured to be executed by one or more processors, and the one or more programs includes instructions used for performing the following operations: receiving a content item obtaining request sent by a content item displaying client, where the content item obtaining request is a content item obtaining request used for obtaining a content item related to a video that is being played by the video playing terminal; determining a current playing moment of the video played by the video playing terminal bound with the content item displaying client; selecting, from one or more content items corresponding to the video, a content item with a marking moment nearest to the current playing moment; and pushing the selected content item to the content item displaying client, where the content item triggers the content item displaying client to display the content item.

Optionally, the one or more programs further include instructions used for performing the following operations: setting, for each video, a marking moment for each content item according to a playing moment of a video frame that is in the video and that is related to the content item, and recording each content item related to the video and the marking moment corresponding to each content item.

Optionally, the one or more programs further include instructions used for performing the following operations: querying, when sending a data stream of the video to the video playing terminal, a content item that is in the record and that is corresponding to a video frame in the data stream, and sending content item prompt information corresponding to the content item, where the content item prompt information includes at least the former one or both of the two of brief information of the queried content item and prompt enabling information that is used for reminding a user to enable the content item displaying client to obtain the content item.

Optionally, optionally, the one or more programs further include instructions used for performing the following operations: querying, when sending a data stream of the video to the video playing terminal, a content item corresponding to a video frame in the data stream, adding content item prompt information of the content item to the corresponding video frame in the data stream, and sending the data stream added with the content item prompt information to the video playing terminal, where the content item prompt information includes at least the former one or both of the two of brief information of the queried content item and prompt enabling information that is used for reminding a user to enable the content item displaying client to obtain the content item.

Optionally, the one or more programs further include instructions used for performing the following operations: establishing a connection to the video playing terminal, and sending a data stream of the video to the video playing terminal according to the connection; and determining, according to the data stream sent to the video playing terminal, the current playing moment of the video that is being played by the video playing terminal.

Optionally, the one or more programs further include instructions used for performing the following operations: receiving a query request sent by the content item displaying client, and querying whether the video playing terminal bound with the content item displaying client is playing a video; and sending a queried query result to the content item displaying client, where the query result is used for triggering the content item displaying client to display a playing status of the video playing terminal according to the query result, where the query request is used for querying whether the video playing terminal bound with the content item displaying client is playing a video.

Figure 3:
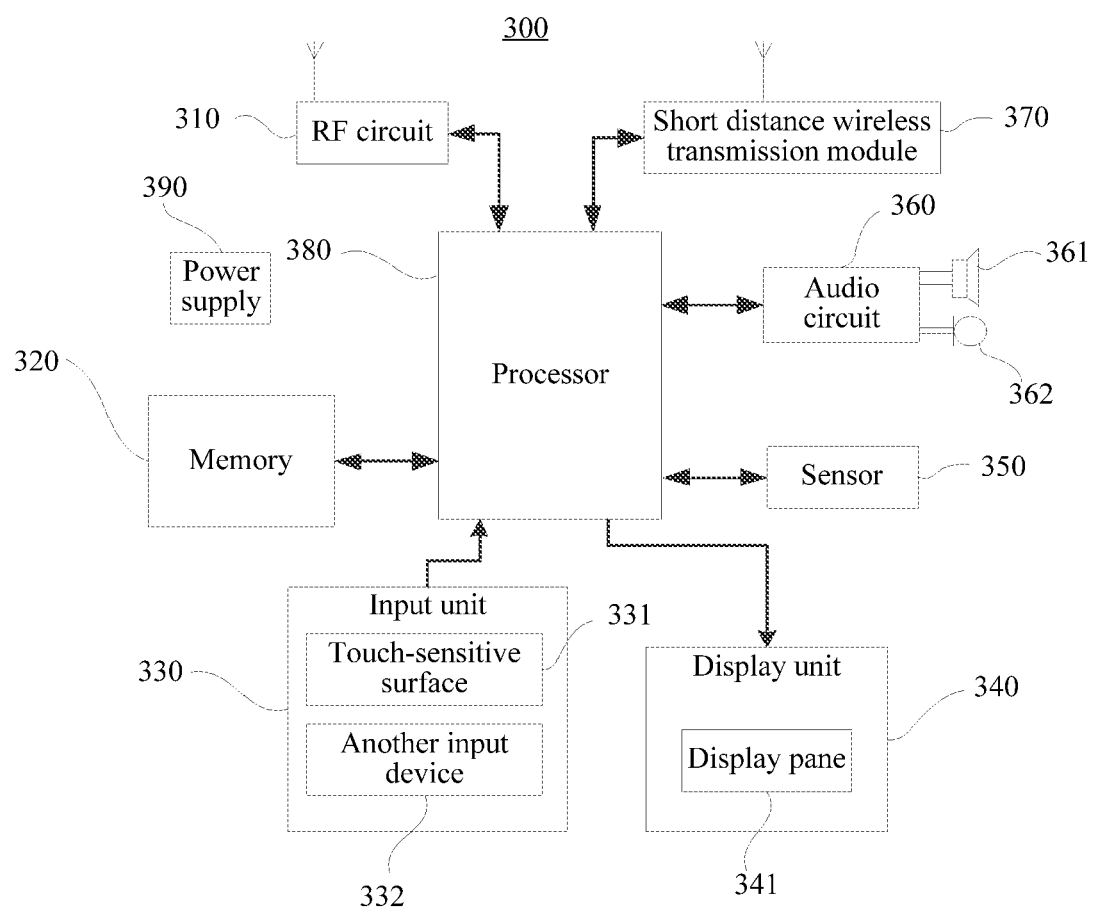
FIG. 3 is a schematic structural diagram of a terminal according to an embodiment of the present invention.

FIG. 3 shows a schematic structural diagram of a terminal according to an embodiment of the present invention. The terminal 300 may be configured to run a content item displaying client 120 or may be a video playing terminal 160. Specifically:

The terminal 300 may include components such as a radio frequency (RF) circuit 310, a memory 320 including one or more computer readable storage media, an input unit 330, a display unit 340, a sensor 350, an audio circuit 360, a short distance wireless transmission module 370, a processor 380 including one or more processing cores, and a power supply 390. A person skilled in the art may understand that a terminal structure shown in FIG. 3 constitutes no limitation to the terminal, and the terminal may include more or fewer components than those shown in the figure, or some components may be combined, or a different component deployment may be used.

The RF circuit 310 may be configured to receive and send signals during an information receiving and sending process or a call process. Particularly, the RF circuit 310 receives downlink information from a base station, then delivers the downlink information to one or more processors 380 for processing, and sends related uplink data to the base station. Generally, the RF circuit 310 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 310 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like. The memory 320 may be configured to store a software program and module. For example, the memory 320 may be configured to store a preset time list, may further be configured to store a software program for collecting a voice signal, a software program for implementing keyword recognition, a software program for implementing continuous voice recognition, and a software program for implementing a setting prompt matter, and may further be configured to store a binding relationship between a radio access point and a user account, or the like. The processor 380 runs the software program and module stored in the memory 320, to implement various functional applications and data processing. The memory 320 may mainly include a program storage area and a data storage area. The program storage area may store an operating system, an application required by at least one function (such as a sound playback function, an image display function, and a touch screen recognition function), and the like. The data storage area may store data created according to use of the terminal 300, and the like. In addition, the memory 320 may include a high speed random access memory, and may also include a non-volatile memory such as at least one magnetic disk storage device, a flash memory, or another volatile solid-state storage device. Correspondingly, the memory 320 may further include a memory controller, so as to control access of the processor 380 and the input unit 330 to the memory 320.

The input unit 330 may be configured to receive input digit or character information, and generate a keyboard, mouse, joystick, optical, or track ball signal input related to the user setting and function control. Specifically, the input unit 330 may include a touch-sensitive surface 331 and another input device 332. The touch-sensitive surface 331, which may also be referred to as a touch screen or a touch panel, may collect a touch operation of a user on or near the touch-sensitive surface (such as an operation of a user on or near the touch-sensitive surface 331 by using any suitable object or accessory, such as a finger or a stylus), and drive a corresponding connection apparatus according to a preset program. Optionally, the touch-sensitive surface 331 may include two parts: a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch signal into touch point coordinates, and sends the touch point coordinates to the processor 380. Moreover, the touch controller can receive and execute a command sent from the processor 380. In addition, the touch-sensitive surface 331 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 340 may be configured to display information input by the user or information provided for the user, and various graphical user interfaces of the terminal 300. The display unit 340 may include a display panel 341, and optionally, the display panel 341 may be configured by using a form such as a liquid crystal display (LCD) or organic light-emitting diode (OLED). Further, the touch-sensitive surface 331 may cover the display panel 341. After detecting a touch operation on or near the touch-sensitive surface 331, the touch-sensitive surface 331 transfers the touch operation to the processor 380, so as to determine the type of the touch event. Then, the processor 380 provides a corresponding visual output on the display panel 341 according to the type of the touch event. Although, in FIG. 4, the touch-sensitive surface 331 and the display panel 341 are used as two separate parts to implement input and output functions, in some embodiments, the touch-sensitive surface 331 and the display panel 341 may be integrated to implement the input and output functions.

The terminal 300 may further include at least one sensor 350, for example, an optical sensor, a motion sensor, and other sensors. Specifically, the optical sensor may include an ambient light sensor and a proximity sensor. The ambient light sensor can adjust luminance of the display panel 341 according to brightness of the ambient light. The proximity sensor may switch off the display panel 341 and/or backlight when the terminal 300 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone gesture (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 300, are not further described herein.

The audio circuit 360, a loudspeaker 361, and a microphone 362 may provide audio interfaces between the user and the terminal 300. The audio circuit 360 may convert received audio data into an electric signal and transmit the electric signal to the loudspeaker 361. The loudspeaker 361 converts the electric signal into a sound signal for output. On the other hand, the microphone 362 converts a collected sound signal into an electric signal. The audio circuit 360 receives the electric signal and converts the electric signal into audio data, and outputs the audio data to the processor 380 for processing. Then, the processor 180 sends the audio data to, for example, another apparatus by using the RF circuit 310, or outputs the audio data to the memory 320 for further processing. The audio circuit 360 may further include an earplug jack, so as to provide communication between a peripheral earphone and the terminal 300.

The short distance wireless transmission module 370 may be a wireless fidelity (WiFi) module a Bluetooth module, or the like. The terminal 370 may help, by using the short distance wireless transmission module 370, the user to receive and send e-mails, browse a webpage, access streaming media, and so on, which provides wireless broadband Internet access for the user. Although FIG. 3 shows the short distance wireless transmission module 370, it may be understood that the short distance wireless transmission module is not a necessary component of the terminal 300, and when required, the short distance wireless transmission module may be omitted as long as the scope of the essence of the present disclosure is not changed.

The processor 380 is a control center of the terminal 300, and is connected to various parts of the mobile terminal by using various interfaces and lines. By running or executing the software program and/or module stored in the memory 320, and invoking data stored in the memory 320, the processor 380 performs various functions and data processing of the terminal 300, thereby performing overall monitoring on the mobile terminal. Optionally, the processor 380 may include the one or more processing cores. Optionally, the processor 380 may integrate an application processor and a modem. The application processor mainly processes an operating system, a user interface, an application, and the like. The modem mainly processes wireless communication. It may be understood that the foregoing modem processor may be not integrated into the processor 380.

The terminal 300 may further include the power supply 390 (for example, a battery) that supplies power for various components. Preferably, the power supply may be logically connected to the processor 380 by using a power management system, so as to implement a function such as charging, discharging and power consumption management by using the power management system. The power supply 390 may further include one or more of a direct current or alternate current power supply, a re-charging system, a power supply fault detection circuit, a power supply converter or an inverter, a power supply state indicator, and any other components.

Although not shown in the figure, the terminal 300 may further include a camera, a Bluetooth module, and the like, and details are not further described herein.

The terminal 300 further includes a memory and one or more programs. The one or more programs are stored in the memory and configured to be executed by one or more processors.

When the terminal 300 is the content item displaying client 120, the processor includes instructions used for performing the following operations: sending, to a content item preparation platform, a content item obtaining request used for requesting to obtain a content item related to a video that is being played by a video playing terminal, where the content item obtaining request is used for triggering the content item preparation platform to determine the video playing terminal bound with the content item displaying client, determine a current playing moment of the video played by the video playing terminal, select, from one or more content items corresponding to the video, a content item with a marking moment nearest to the current playing moment, and push the selected content item to the content item displaying client; and displaying the received content item.

Optionally, the one or more programs further include instructions used for performing the following operations: sending a query request to the content item preparation platform, where the query request is used for querying whether the video playing terminal bound with the content item displaying client is playing a video, and the query request is used for triggering the content item preparation platform to query whether the video playing terminal bound with the content item displaying client is playing a video, and sending a query result to the content item displaying client; and displaying a playing status of the video playing terminal.

Optionally, the one or more programs further include instructions used for performing the following operations: receiving a slide instruction acting on a content item display interface; and sequentially displaying, according to a direction indicated by the slide instruction, content items of the video that exist on the content item display interface.

Optionally, the one or more programs further include instructions used for performing the following operations: receiving operation information on a displayed content item, and executing an operation corresponding to the operation information.

Exemplary Architecture Summarization

In an exemplary embodiment, the disclosed system may allow, when a video playing terminal is playing a video, a user to display, by using a content item displaying client, a content item that is related to the video and that is played synchronously with the video.

The video playing terminal 160 is configured to obtain a video from the content item preparation platform 140 and play the video.

The content item displaying client 120 is configured to send, to the content item preparation platform 140, a content item obtaining request used for requesting to obtain a content item related to a video that is being played by the video playing terminal 160.

The content item obtaining request may carry a user account of the content item displaying client 120.

The content item preparation platform 140 is configured to: determine, when receiving the content item obtaining request, a current playing moment of the video played by the video playing terminal 160, select, from one or more content items corresponding to the video, a content item with a marking moment nearest to the current playing moment, and push the selected content item to the content item displaying client 120.

When receiving the content item obtaining request, the content item preparation platform 140 may learn the user account of the content item displaying client 120, search an identifier of a video playing terminal bound with the user account, to determine the video playing terminal 160 bound with the content item displaying client 120, determine, according to a video stream provided to the video playing terminal 160, a video played by the video playing terminal 160 and a current playing moment of the video played by the video playing terminal 160, select, from one or more content items corresponding to the video, a content item with a marking moment nearest to the current playing moment, and push the selected content item to the content item displaying client 120.

The content item displaying client 120 is further configured to display the received content item.

In various embodiments, the system for displaying a content item provided in this embodiment of the present invention sends a content item corresponding to a video to a content item displaying client bound with a video playing terminal, thereby separating playing of the video from displaying of the content item, so that the content item displaying client displays the content item while the video playing terminal plays the video, thereby resolving the problem that because a content item is inserted into a video, playing of the content item needs to exclusively occupy a screen of a video playing terminal; consequently, a video that is being played must pause, which further affects a playing progress; and achieve effects of ensuring that the content item corresponding to the video is displayed while the video is played, and that impact of the content item for a video playing progress is avoided.

The content item preparation platform needs to set a marking moment for the content item related to the video, that is, set, according to a playing moment of the video, a marking moment for the content item related to the video.

In an exemplary embodiment: the content item preparation platform 140 is further configured to set, for each video, a marking moment for each content item according to a playing moment of a video frame that is in the video and that is related to the content item, and record each content item related to the video and the marking moment corresponding to each content item. Optionally, the marking moment of the content item may be set to a playing moment of a video frame in video frames related to the content item. Optionally, the marking moment of the content item may further be set to a playing moment range formed by playing moments of video frames related to the content item.

Optionally, the content item preparation platform 140 may determine, according to image recognition or voice recognition, a video frame that is in the video and that is corresponding to the content item. For example, when the content item is a glasses advertisement, an image of the video frame determined according to image recognition includes glasses corresponding to the glasses advertisement. For another example, when the content item is a topic voting, audio data corresponding to the video frame determined according to voice recognition involves a topic corresponding to the topic voting. Obviously, the content item preparation platform 140 may further determine, according to another manner, the video frame that is in the video and that is corresponding to the content item. Details are not further described herein.

Optionally, when configuring a content item, the content item preparation platform 140 generally further configures a content item name for the content item, so that when displaying the content item, the content item displaying client 120 displays the content item name and a marking moment corresponding to the content item.

Optionally, a management user of the content item preparation platform 140 may filter, from the video, video frames related to the content item, and use playing moments of these video frames to associate with the content item corresponding to the video frames. Optionally, after performing association on an interface displayed by the content item preparation platform 140, the manage user triggers a confirm control, and the content item preparation platform 140 correspondingly receives an association instruction, and associates the playing moments of these video frames with the content item corresponding to the video frames, that is, uses these playing moments to set marking moments for these content items separately.

For example, when a video frame with a playing moment in a video being the $23^{rd}$ minute and the $40^{th}$ second is related to an advertisement 1, a marking moment set for the advertisement 1 is the $23^{rd}$ minute and the $40^{th}$ second of the video; and when a video frame with a playing moment in a video being the $30^{th}$ minute and the $35^{th}$ second is related to a topic voting 1, a marking moment set for the topic voting 1 is the $30^{th}$ minute and the $35^{th}$ second of the video.

Optionally, the content item preparation platform 140 receives configuration information sent by a configuration background, and configures a content item according to the configuration information. According to different content item content, a manner for configuring the content item is also different. Using a content item being a topic voting as an example, a voting configuration background sends set configuration information, such as a topic, a voting parameter, an option, and a picture, to the content item preparation platform 140, and the content item preparation platform 140 sets a content item identifier and a content item name for a configured content item, and configures, for the content item, the configuration information, such as the topic, the voting parameter, the option, and the picture, sent by the voting configuration background. Then, using a content item being an advertisement as an example, a product management background sends set configuration information, such as a product identifier, and a picture, a price, and a purchase link that are related to a product, to the content item preparation platform 140, and the content item preparation platform 140 sets a content item identifier and a content item name for a configured content item, and configures, for the content item, the configuration information, such as the product identifier, and the picture, the price, and the purchase link that are related to the product, sent by the product management background. Optionally, the content item identifier and the content item name may be same content, for example, both are "interactive questions and answers", or "Piano Music YAMAHA Piano". Then, using a content item being red packet reception as an example, a red packet reception background sends red packet related information to the content item preparation platform 140, and the content item preparation platform 140 sets a content item identifier, a content item name, content item reception manner description information and the like for a red packet. A red packet, as used herein, may refer to a coupon incentive or a money reward.

Figure 4A:
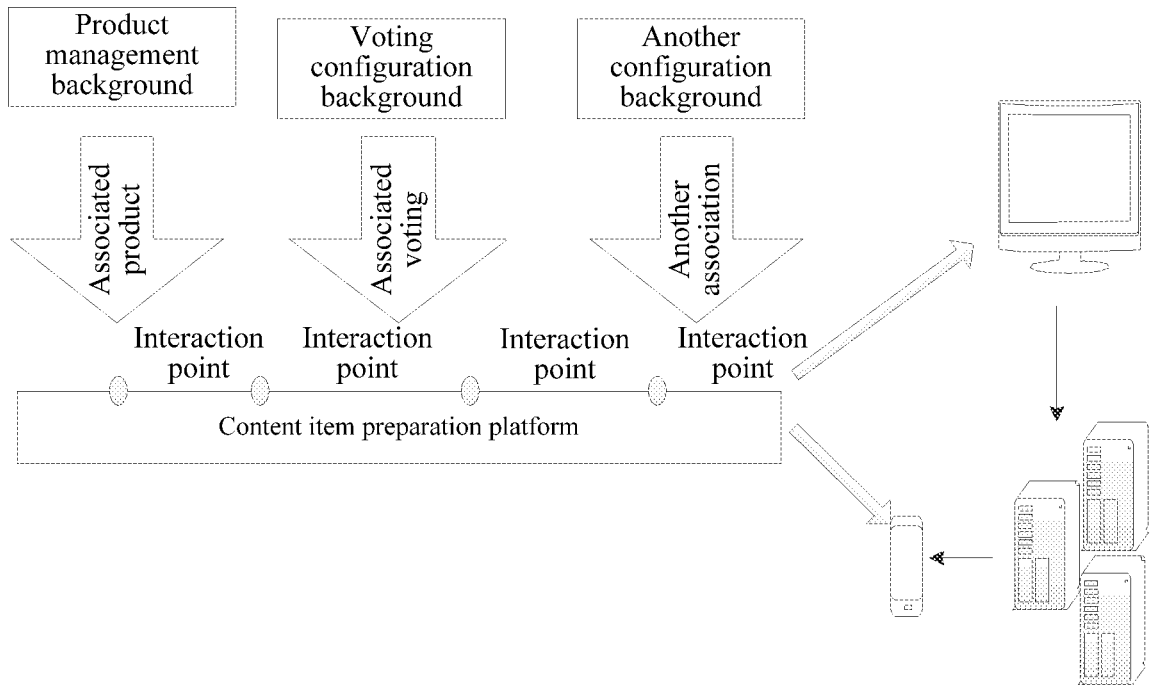
FIG. 4A to FIG. 4E are schematic diagrams of implementations of a system for displaying a content item according to some embodiments of the present invention.

Referring to FIG. 4A, the content item preparation platform 140 generates a content item according to configuration information sent by a product management background, a voting configuration background, or another configuration background, and sets a marking moment for each content item based on a playing moment of a video.

In various embodiments, the content item preparation platform may configure a related content item for each video, record and store a content item corresponding to each video and a marking moment corresponding to each content item, where the marking moment of the content item is the same as or similar to a playing moment of a video frame of the content item. In this way, when the content item displaying client needs to obtain a content item of the video, the content item displaying client may push, according to the playing moment of the video and the marking moment of the content item of the video, a content item that meets a condition to a content item client.

The content item preparation platform 140 may provide a video and content item prompt information related to the video to the video playing terminal 160, so that the video playing terminal 160 displays the content item prompt information, further prompts a user that a content item exists in the video, and further guides the user to enable the content item displaying client 120 when the user has interest in the content item.

In an exemplary embodiment: the content item preparation platform 140 is further configured to: query, when sending a data stream of the video to the video playing terminal 160, a content item that is in the record and that is corresponding to a video frame in the data stream, and send content item prompt information corresponding to the content item, where the content item prompt information includes at least the former one or both of the two of brief information of the queried content item and prompt enabling information that is used for reminding a user to enable the content item displaying client to obtain the content item. When a video has a related content item, in order to enable a user to open the content item displaying client 120 when watching the video playing terminal 160, so that the user watches a video played by the video playing terminal 160 while viewing, on the content item displaying client 120, the content item related to the video, the content item preparation platform 140 may further query, when sending a data stream of the video to the video playing terminal 160, a content item that is in the record and that is corresponding to a video frame in the data stream, and sends content item prompt information corresponding to the content item to the video playing terminal 160.

Optionally, when whether a content item corresponding to the video frame in the data stream exists in the record is queried, whether a marking moment exists in a content item between a playing start moment and a playing end moment of the data stream may be queried, and if a marking moment exists in the content item between the playing start moment and the playing end moment of the data stream, the content item is determined as the content item corresponding to the video frame in the data stream.

Optionally, the content item preparation platform 140 may send the content item prompt information and a data stream corresponding to the content item prompt information together to the video playing terminal 160.

The video playing terminal 160 is further configured to receive the data stream and the content item prompt information that are sent by the content item preparation platform 140, and when playing the data stream, play the content item prompt information corresponding to the data stream.

When playing a video according to the data stream, the video playing terminal 160 detects whether the content item prompt information is corresponding to the data stream, and if exists, displays the content item prompt information on a screen when playing the data stream.

Generally, the content item prompt information may include brief information of the queried content item, such as a name or a picture of the content item. Optionally, in order to prompt that the user may open the content item displaying client 120, the content item prompt information may further include prompt enabling information (i.e., reminder information) used for reminding a user to enable the content item displaying client to obtain the content item (e.g., reminding the user to open a related APP on the phone).

Figure 4B:
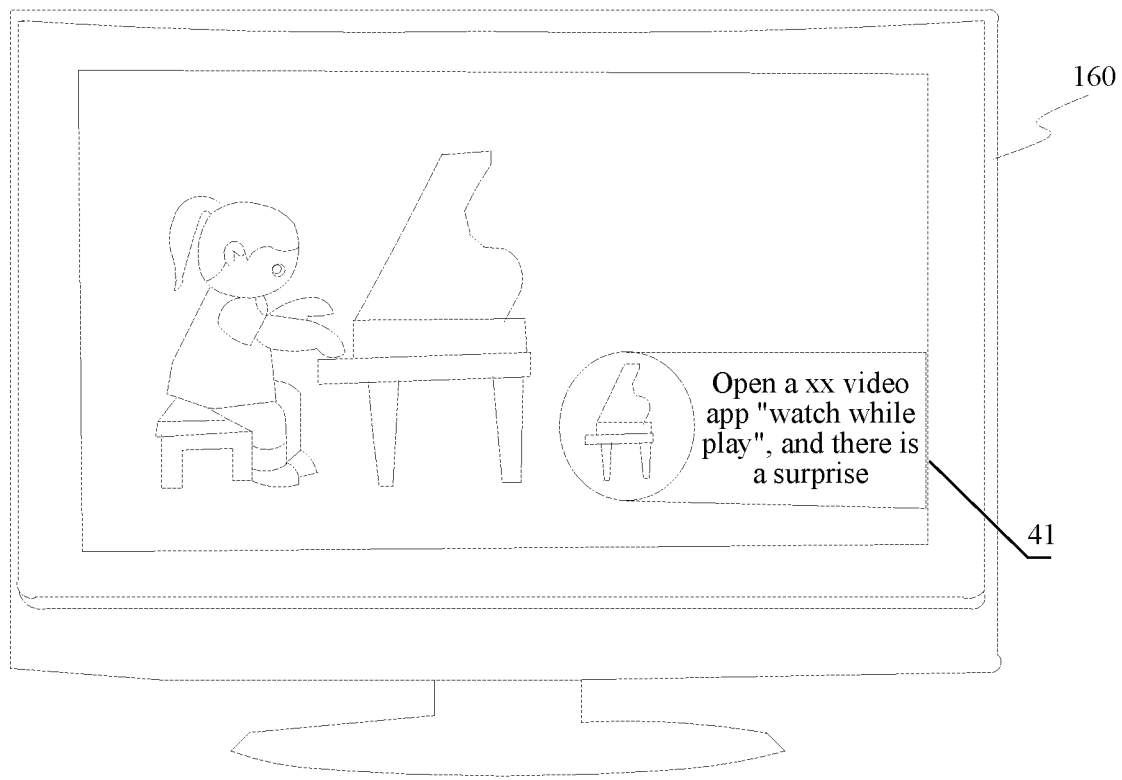

Referring to FIG. 4B, when playing a video, the video playing terminal 160 further displays content item prompt information 41 on a screen, for example, brief information of a content item included in the content item prompt information is a picture of a piano, and the prompt enabling information further included in the content item prompt information is "Open a xx video app "Watch While Play", and there is a surprise".

Optionally, the content item preparation platform 140 may further add the content item prompt information on a corresponding video frame of a related data stream. In this way, the video playing terminal 160 may directly play the added video frame, and the content item prompt information is displayed on the played video frame. For example, when the content item prompt information is strongly related to the continuous $100^{th}$ video frame to $257^{th}$ video frame, the content item preparation platform 140 may add the content item prompt information on the $100^{th}$ video frame to the $257^{th}$ video frame. When the $100^{th}$ video frame to the $257^{th}$ video frame are played, the content item prompt information is displayed on these video frames.

Optionally, when the content item prompt information is corresponding to multiple video frames, the content item prompt information may be a static element or may be a dynamic element. Using content item prompt information being "shake to receive a red packet" as an example, the content item prompt information includes a phone icon, and when the content item prompt information is displayed, the phone icon may be dynamically displayed to vividly show a "shake" action.

In various embodiments, the content item preparation platform may provide content item prompt information related to the video to the video playing terminal, so that when playing the video, the video playing terminal displays the content item prompt information, and further prompts the user to open the content item displaying client, to watch a content item related to the video. In this way, the user enables the content item displaying client only when the user sees the content item prompt information displayed by the video playing terminal, and has interest in the related content item, so as to avoid that the content item displaying client is always in an enabled status.

The video playing terminal 160 may obtain a video stream from the content item preparation platform 140 and play the video stream. Because a data stream is corresponding to a video playing moment, the content item preparation platform 140 may determine, according to the data stream sent to the video playing terminal 160, a video played by the video playing terminal 160 and a current playing moment of the played video.

In an exemplary embodiment: the video playing terminal 160 is further configured to establish a connection to the content item preparation platform 140, download the data stream of the video from the content item preparation platform according to the connection, and play the video according to the data stream.

Optionally, the video playing terminal 160 may establish the connection to the content item preparation platform 140 by using a wired network or a wireless network.

The content item preparation platform 140 is further configured to establish a connection to the video playing terminal 160, and send a data stream of the video to the video playing terminal 160 according to the connection; and determine, according to the data stream sent to the video playing terminal 160, the current playing moment of the video that is being played by the video playing terminal 160.

In an actual application, after the video playing terminal 160 establishes a connection to the content item preparation platform 140, the video playing terminal 160 may learn an on-demand request video directory provided by the content item preparation platform 140, and the user may request any video on demand. After the user requests on demand, the video playing terminal 160 sends, to the content item preparation platform 140, an on-demand request used for obtaining the video, the content item preparation platform 140 establishes a transmission path (the transmission path may be uniformly corresponding to an identifier of the video) to the video playing terminal 160, and the content item preparation platform 140 sends in real time a data stream of the video through the transmission path to the video playing terminal 160.

The video playing terminal 160 downloads and plays the video from the content item preparation platform 140 in real time; therefore, the content item preparation platform 140 may determine, according to the data stream of the video provided to the video playing terminal 160, a video that is being played by the video playing terminal 160, and a current playing moment when the video playing terminal 160 plays the video, that is, which moment of the video is played by the video playing terminal 160.

It should be noted that, because the data stream is continuously sent to the video playing terminal 160, the video playing terminal 160 may be affected by other elements, and the current playing moment of the video playing terminal 160 is not completely the same as the playing moment determined by the content item preparation platform 140 according to the data stream delivered to the video playing terminal 160. Generally, the current playing moment of the video playing terminal 160 is generally a certain moment before a start moment of the data stream finally sent by the content item preparation platform 140 to the video playing terminal 160, and duration between the current playing moment of the video playing terminal 160 and the start moment of the data stream finally sent by the content item preparation platform 140 to the video playing terminal 160 is less than a preset duration threshold.

The content item displaying client 120 may learn, by using the content item preparation platform 140, a playing status of the video playing terminal 160 bound with the content item displaying client 120.

In an exemplary embodiment: the content item displaying client 120 is further configured to send a query request to the content item preparation platform 140, where the query request is used for querying whether the video playing terminal 160 bound with the content item displaying client is playing a video.

After the user opens the content item displaying client 120, the content item displaying client 120 sends a query request to the content item preparation platform 140, to request to obtain a playing status of the video playing terminal 160 bound with the content item displaying client 120.

Optionally, the query request carries a user account of the content item displaying client 120.

The content item preparation platform 140 is further configured to receive the query request, query whether the video playing terminal 160 bound with the content item displaying client 120 is playing a video, and send a query result to the content item displaying client 120.

After receiving the query request, the content item preparation platform 140 may search the video playing terminal 160 bound with the user account or with the content item displaying client 120, and after querying the video playing terminal 160, detect the playing status of the video playing terminal 160.

Optionally, when the video playing terminal 160 downloads the data stream of the video from the content item preparation platform 140, the content item preparation platform 140 may record an identifier of the video playing terminal 160 and an identifier of the video. In this way, the content item preparation platform 140 may detect the playing status of the video playing terminal 160 according to the record. When the video playing terminal 160 is downloading the data stream of the video, it indicates that the video playing terminal 160 is playing a video. The content item displaying client 120 is further configured to display the playing status of the video playing terminal according to the query result.

Figure 4C:

When the query result is used for indicating that the video playing terminal 160 bound with the content item displaying client 120 is playing a video, the content item displaying client 120 displays that the video playing terminal 160 is online. Referring to FIG. 4C, when the content item displaying client 120 opens a personal central interface, the content item displaying client 120 displays a playing status 42, such as "TV online", of the video playing terminal 160 on the personal central interface. In this case, the user may select a Watch While Play detailed page to view the content item pushed by the content item preparation platform 140.

Figure 4D:
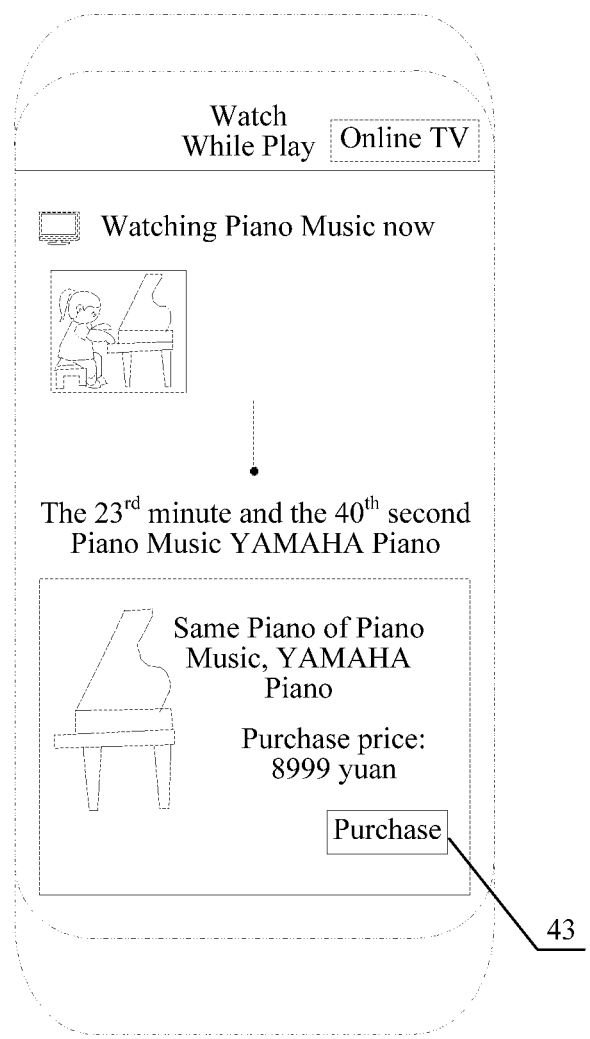

For example, the Watch While Play detailed page (that is, a content item display interface) may be shown in FIG. 4D, where a content item is displayed, the content item is used for recommending purchase information about a piano advertisement related to a video Piano Music that is being played by the video playing terminal 160, and while the content item is displayed, the marking moment "the 23$^{rd}$ minute and the 40<sup>th</sup> second" of the content item and the content item name "Piano Music YAMAHA Piano" may be further displayed.

Figure 4E:
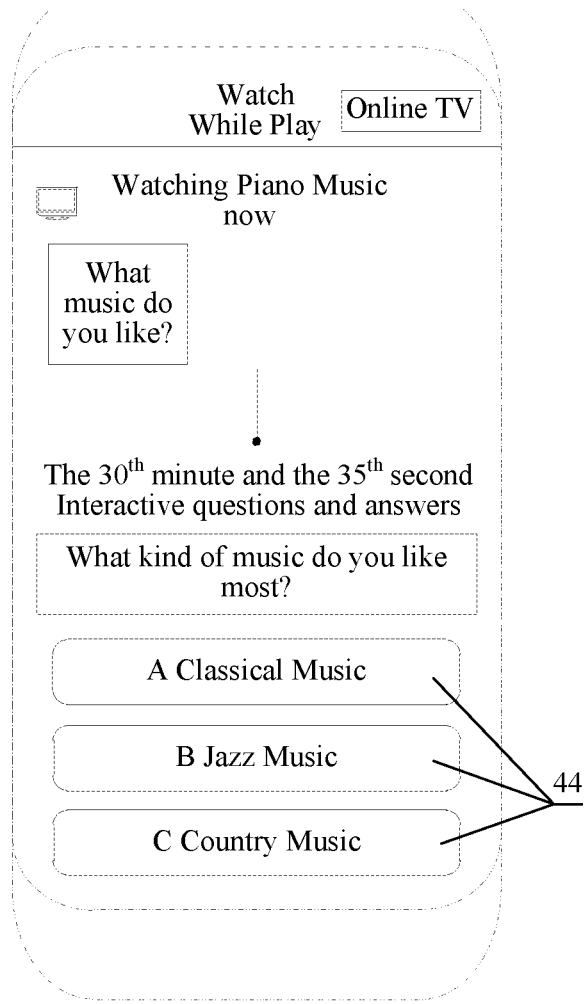

For example, the Watch While Play detailed page (that is, a content item display interface) may be shown in FIG. 4E, where a content item is displayed, the content item is used for recommending voting information of a topic voting related to a video Piano Music that is being played by the video playing terminal 160, and while the content item is displayed, the marking moment "the 30<sup>th</sup> minute and the 35<sup>th</sup> second" of the content item and the content item name "Piano Music YAMAHA Piano" may be further displayed.

When the content item is displayed, both the marking moment of content item and the content item name are displayed, so that the user can know which playing moment or playing location of a video that is being played by the content item correspondingly.

Optionally, when the user watches a video, if the content item displaying client 120 obtains at least two content items of the video from the content item preparation platform 140, the content item displaying client 120 may display these content items in an up-to-down order according to marking moments of the content items.

Optionally, when it is detected that the video playing terminal 160 is not online or is playing nothing, the "TV online" identifier is not displayed, and the user may enter a "Watch While Play" introduction page.

It should further be noted that, when the content item preparation platform 140 determines that the video playing terminal 160 has established a connection to the content item preparation platform 140, but the video playing terminal 160 has not downloaded a data stream of a video from the content item preparation platform 140, in this case, the content item preparation platform 140 may also determine that the video playing terminal 160 is online, but does not push a content item to the corresponding content item displaying client 120. In this case, the playing status is an online status.

Because in a process in which the video playing terminal 160 plays a video, the content item displaying client 120 may obtain, from the content item preparation platform 140, multiple content items related to the video, and display the content items in a content item display interface, the user may search each obtained content item by sliding.

In an exemplary embodiment: the content item displaying client 120 is further configured to receive a slide instruction acting on a content item display interface, and display, in an order according to a direction indicated by the slide instruction, content items of the video that received by the content item display interface.

Optionally, the content item displaying client 120 may display obtained content items of a same video on a same content item display interface, so that the user may pull, by sliding up and down, a content item that exists below/after or above/before currently displayed content item on the content item display interface. Optionally, the content item displaying client 120 may set a content item display interface page for each content item, so that the user may pull, by sliding left and right, a content item display interface of a former page of the current content item display interface or a content item display interface of a next page of the content item display interface.

In various embodiments, while the user watches a video, the content item displaying client may pull, under control of the user, more content items that are previously obtained and that are related to the video.

In a possible implementation manner, when a video is played completely, the content item displaying client 120 may store the pulled content item related to the video; and optionally, when a video is played completely, the content item displaying client 120 may further clear all pulled content items that are related to the video and that are on the content item display interface. Therefore, cleanness of the content item display interface is ensured, and content item display of the user for another video is not affected.

The content item displaying client 120 may display content items played synchronously with the video, and these content items may provide interactive activities such as purchase and voting to the user, so that while the user watches a video played by the video playing terminal 160, concentrated and interactive experience of watching the video is greatly improved.

In an exemplary embodiment: the content item displaying client 120 is further configured to receive operation information on the displayed content item, and execute an operation corresponding to the operation information. For example, when a purchase quick entry is set on the displayed content item, and after the purchase quick entry is triggered, a purchase link page of a product corresponding to the content item skips to be displayed. For another example, when voting options are set on the displayed content item, and after one voting option is triggered, generated voting information is sent to a vote collection background. For another example, when a product/red packet reception entry is set on the displayed content item, and after the product/red packet reception entry is triggered, a product/red packet reception page corresponding to the content item skips to be displayed.

For example, still referring to FIG. 4D, when the content item is a product advertisement, the user may select a purchase control 43 displayed in the content item, and the content item displaying client 120 may submit purchase information for purchasing the product to a product providing background. For another example, still referring to FIG. 4E, when the content item is a topic voting, the user may select a control 44 required for voting, and the content item displaying client 120 may provide voting information selected by the user to a vote collection background.

Optionally, the content item displaying client 120 may further receive a share instruction for sharing the content item, and share the content item to a friend user of the content item displaying client 120. Because the users may perform interaction according to the content item, to express personalized attitudes, which can more enhance a share frequency, and enlarge an influence range of video content.

In addition, when the content item is a product associated with content of a video frame or with voice data corresponding to a video frame, the user does not need manually search the related product; instead, may directly learn the related product according to the displayed content item. Therefore, a path from a user watching a video to consuming a related product is shortened.

When the content item is a voting or an interactive content item, online watching users in an asynchronous space all may participate in real time interactions strongly related to the video content, to implement cross communication of video content space and time and user watching space and time, and enhance interaction and friendliness between the users.

Because the user may participate in a related topic or participate in a purchase activity in real time according to the content item, synchronous display of the content item and the video and operability of the content item are relatively preferred by advertisers, and the watch while play feature greatly weakens disturbance of advertising content for the user, and further strengthens the advertising value.

Figure 5:
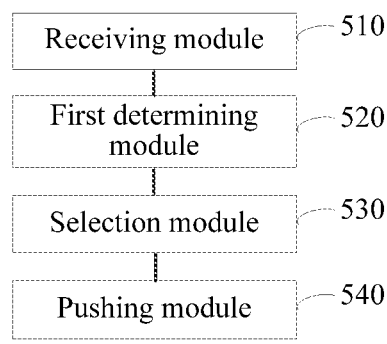
FIG. 5 is a structural block diagram of a content item preparation platform according to an embodiment of the present invention.

FIG. 5 shows a structural block diagram of a content item preparation platform according to an embodiment of the present invention. The content item preparation platform 500 includes: a receiving module 510, a first determining module 520, a selection module 530, and a pushing module 540.

The receiving module 510 is configured to receive a content item obtaining request sent by a content item displaying client, where the content item obtaining request is used for requesting to obtain a content item related to a video that is being played by a video playing terminal.

The first determining module 520 is configured to determine a current playing moment of the video played by the video playing terminal bound with the content item displaying client.

The selection module 530 is configured to select, from one or more content items corresponding to the video, a content item with a marking moment nearest to the current playing moment.

The pushing module 540 is configured to push the content item selected by the selection module 530 to the content item displaying client, where the content item triggers the content item displaying client to display the content item.

Figure 6:
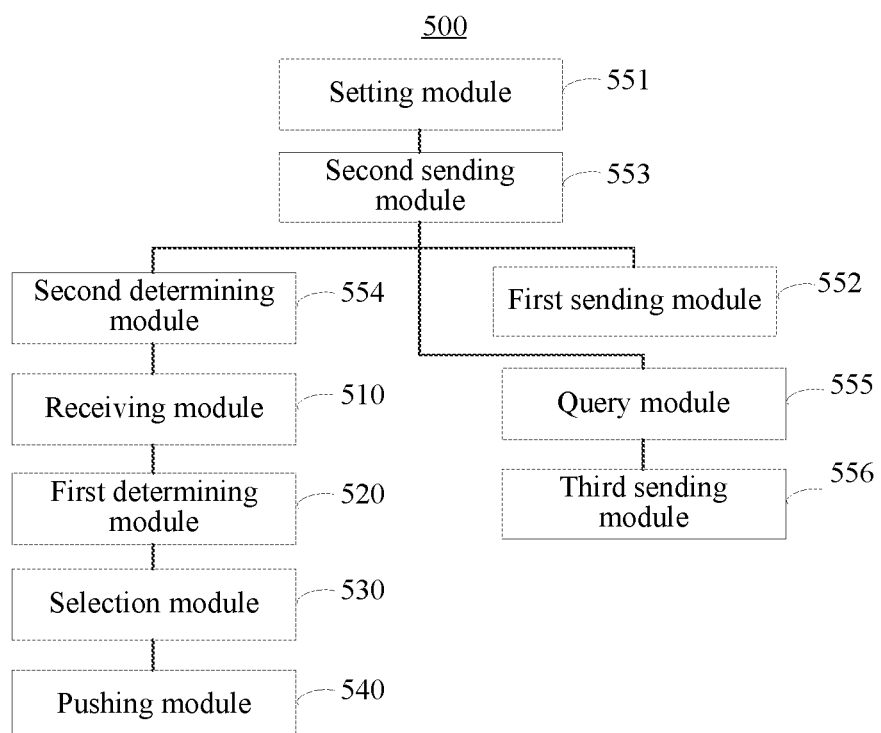
FIG. 6 is a structural block diagram of a content item preparation platform according to another embodiment of the present invention.

In an optional embodiment, the content item preparation platform 500 further includes: a setting module 551, as shown in FIG. 6.

The setting module 551 is configured to set, for each video, a marking moment for each content item according to a playing moment of a video frame that is in the video and that is related to the content item, and record each content item related to the video and the marking moment corresponding to each content item.

In an optional embodiment shown in FIG. 6, the content item preparation platform 500 further includes: a first sending module 552.

The first sending module 552 is further configured to: query, when sending a data stream of the video to a video playing terminal, a content item that is in the record and that is corresponding to a video frame in the data stream, send content item prompt information corresponding to the content item, where the content item prompt information is used for triggering the video playing terminal to receive the data stream and the content item prompt information that are sent by the content item preparation platform, and when playing the data stream, play the content item prompt information corresponding to the data stream.

The content item prompt information includes at least the former one or both of the two of brief information of the queried content item and prompt enabling information that is used for reminding a user to enable the content item displaying client to obtain the content item.

In an optional embodiment shown in FIG. 6, the content item preparation platform 500 further includes: a second sending module 553 and a second determining module 554.

The second sending module 553 is configured to establish a connection to the video playing terminal, and send a data stream of the video to the video playing terminal according to the connection;

The second determining module 554 is configured to determine, according to the data stream sent to the video playing terminal, a current playing moment of the video that is being played by the video playing terminal.

In an optional embodiment shown in FIG. 6, the content item preparation platform 500 further includes: a query module 555 and a third sending module 556.

The query module 555 is configured to receive a query request sent by the content item displaying client, and query whether the video playing terminal bound with the content item displaying client is playing a video.

The third sending module 556 is configured to send the query result queried by the query module 555 to the content item displaying client, where the query result is used for triggering the content item displaying client to display a playing status of the video playing terminal according to the query result.

The query request is used for querying whether the video playing terminal bound with the content item displaying client is playing a video.

In various embodiments, the content item preparation platform provided in this embodiment of the present invention sends a content item corresponding to a video to a content item displaying client bound with a video playing terminal, thereby separating playing of the video from displaying of the content item, so that the content item displaying client displays the content item while the video playing terminal plays the video, thereby resolving the problem that because a content item is inserted into a video, playing of the content item needs to exclusively occupy a screen of a video playing terminal; consequently, a video that is being played must pause, which further affects a playing progress; and achieve effects of ensuring that a content item corresponding to the video is displayed while the video is played, and that impact of the content item for a video playing progress is avoided.

Figure 7:
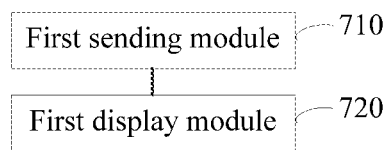
FIG. 7 is a structural block diagram of a content item displaying client according to an embodiment of the present invention.

FIG. 7 shows a structural block diagram of a content item displaying client according to an embodiment of the present invention. The content item displaying client 700 may include: a first sending module 710 and a first display module 720.

The first sending module 710 is configured to send, to a content item preparation platform, a content item obtaining request used for requesting to obtain a content item related to a video that is being played by a video playing terminal, where the content item obtaining request is used for triggering the content item preparation platform to determine the video playing terminal bound with the content item displaying client, determining a current playing moment of the video played by the video playing terminal, select, from one or more content items corresponding to the video, a content item with a marking moment nearest to the current playing moment, and push the selected content item to the content item displaying client;

The first display module 720 is configured to display the received content item.

Figure 8:
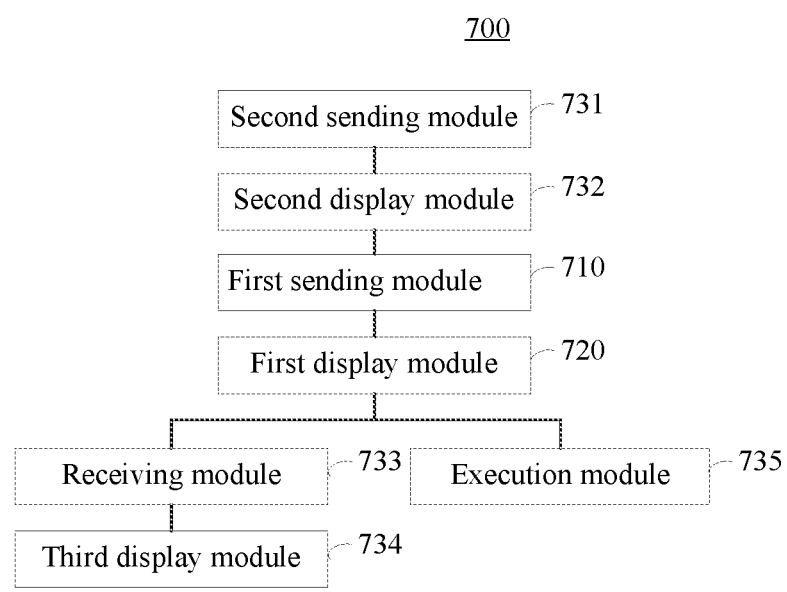
FIG. 8 is a structural block diagram of a content item displaying client according to another embodiment of the present invention.

In an optional embodiment, the content item displaying client 700 may further include: a second sending module 731 and a second display module 732, as shown in FIG. 8.

The second sending module 731 is configured to send a query request to the content item preparation platform, where the query request is used for querying whether the video playing terminal bound with the content item displaying client is playing a video, and the query request is used for triggering the content item preparation platform to query whether the video playing terminal bound with the content item displaying client is playing a video, and send a query result to the content item displaying client.

The second display module 732 is configured to display a playing status of the video playing terminal according to the query result.

In a possible embodiment shown in FIG. 8, the content item displaying client 700 may further include: a receiving module 733 and a third display module 734.

The receiving module 733 is configured to receive a slide instruction acting on the content item display interface;

The third display module 734 is configured to sequentially display, according to a direction indicated by the slide instruction, content items of the video that exist on the content item display interface.

In a possible embodiment shown in FIG. 8, the content item displaying client 700 may further include: an execution module 735.

The execution module 735 is configured to receive operation information on a displayed content item, and execute an operation corresponding to the operation information.

In various embodiments, the content item displaying client provided in this embodiment of the present invention receives a content item corresponding to a video played by a video playing terminal bound with the content item displaying client, thereby separating playing of the video from displaying of the content item, so that the content item displaying client displays the content item while the video playing terminal plays the video, thereby resolving the problem that because a content item is inserted into a video, playing of the content item needs to exclusively occupy a screen of a video playing terminal; consequently, a video that is being played must pause, which further affects a playing progress; and achieve effects of ensuring that a content item corresponding to the video is displayed while the video is played, and that impact of the content item for a video playing progress is avoided.

Figure 9:
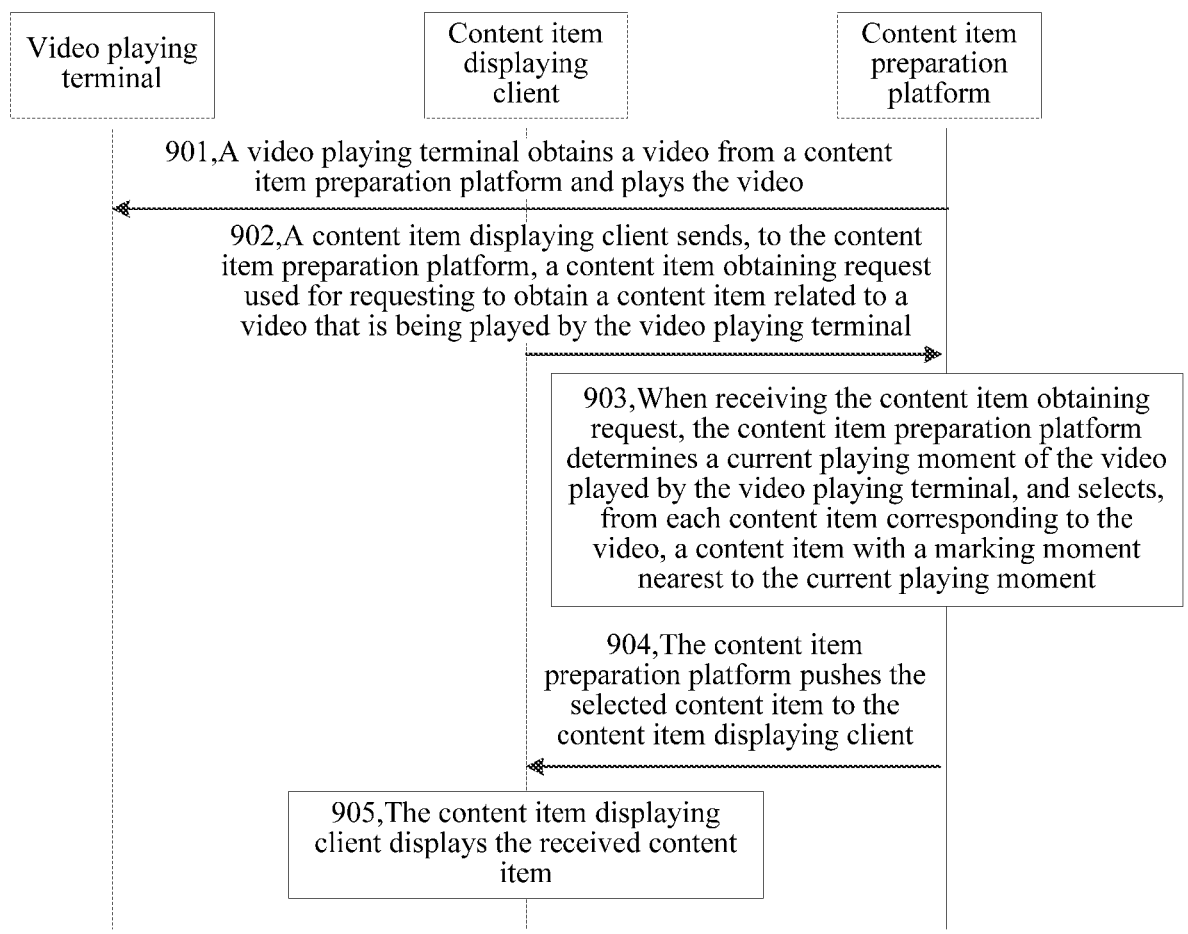
FIG. 9 is a flowchart of a method for displaying a content item according to an embodiment of the present invention.

FIG. 9 shows a flowchart of a method for displaying a content item according to an embodiment of the present invention. The method for displaying a content item is described by using an example of applying to the system shown in FIG. 1. The method includes:

Step 901: A video playing terminal obtains a video from a content item preparation platform and plays the video.

Step 902: A content item displaying client sends, to the content item preparation platform, a content item obtaining request used for requesting to obtain a content item related to a video that is being played by the video playing terminal.

Step 903: When receiving the content item obtaining request, the content item preparation platform determines a current playing moment of the video played by the video playing terminal, and selects, from one or more content items corresponding to the video, a content item with a marking moment nearest to the current playing moment.

Step 904: The content item preparation platform pushes the selected content item to the content item displaying client.

Step 905: The content item displaying client displays the received content item.

In various embodiments, according to the method for displaying a content item provided in this embodiment of the present invention, a content item corresponding to a video played by a video playing terminal bound with a content item displaying client is received, thereby separating playing of the video from displaying of the content item, so that the content item displaying client displays the content item while the video playing terminal plays the video, thereby resolving the problem that because a content item is inserted into a video, playing of the content item needs to exclusively occupy a screen of a video playing terminal; consequently, a video that is being played must pause, which further affects a playing progress; and achieve effects of ensuring that a content item corresponding to the video is displayed while the video is played, and that impact of the content item for a video playing progress is avoided.

Figure 10:
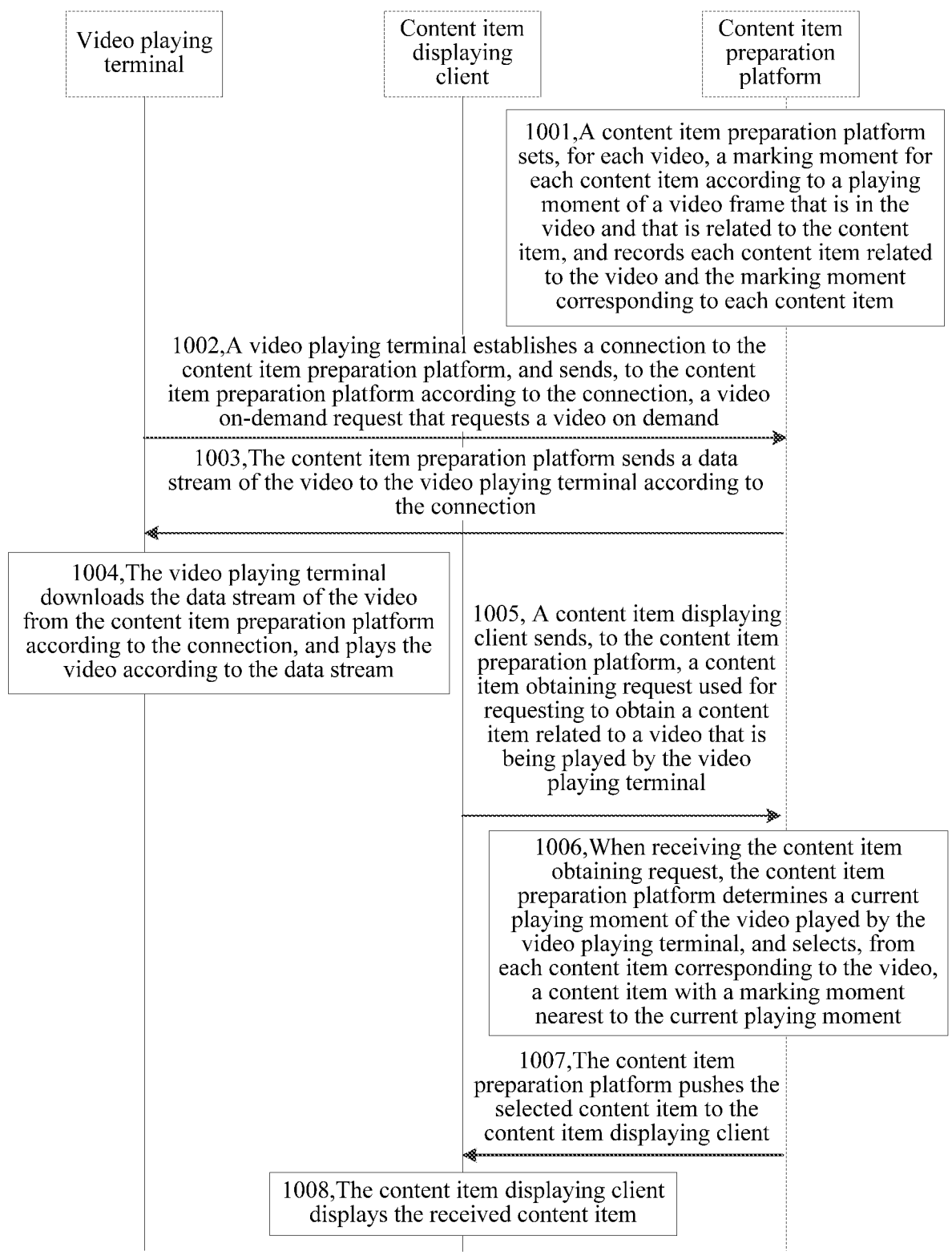
FIG. 10 is a flowchart of a method for displaying a content item according to another embodiment of the present invention.

FIG. 10 shows a flowchart of a method for displaying a content item according to another embodiment of the present invention. The method for displaying a content item is described by using an example of applying to the system shown in FIG. 1. The method includes:

Step 1001: A content item preparation platform sets, for each video, a marking moment for each content item according to a playing moment of a video frame that is in the video and that is related to the content item, and records each content item related to the video and the marking moment corresponding to each content item.

In order to implement video watching experience of watch while play, the content item preparation platform needs to set a marking moment for a content item related to the video, that is, set, according to a playing moment of the video, a marking moment for the content item related to the video.

The video frame related to the content item is generally strongly related to content of the content item. Optionally, the content item preparation platform may determine, according to image recognition or voice recognition, a video frame that is in the video and that is corresponding to the content item. For example, when the content item is a glasses advertisement, an image of the video frame determined according to image recognition includes glasses corresponding to the glasses advertisement. For another example, when the content item is a topic voting, audio data corresponding to the video frame determined according to voice recognition involves a topic related to the topic voting.

Optionally, a management user of the content item preparation platform may filter, from the video, video frames strongly related to the content item, and use playing moments of these video frames to associate with the content item corresponding to the video frames. Optionally, after performing association on an interface displayed by the content item preparation platform, the manage user triggers a confirm control, and the content item preparation platform correspondingly receives an association instruction, and associates the playing moments of these video frames with the content item corresponding to the video frames, that is, uses these playing moments to set marking moments for these content items separately.

Step 1002: A video playing terminal establishes a connection to the content item preparation platform, and sends, to the content item preparation platform according to the connection, a video on-demand request that requests a video on demand.

The video playing terminal may establish the connection to the content item preparation platform by using a wired network or a wireless network.

The video on-demand request carries an on-demand video identifier, and the video identifier is used for uniquely identifying the video.

Optionally, after the video playing terminal establishes the connection to content item preparation platform, the video playing terminal may obtain, from the content item preparation platform, a list of videos that may be requested on demand and that are provided by the content item preparation platform, and after a user selects one video, the video playing terminal sends, to the content item preparation platform, the video on-demand request that requests a video on demand.

Step 1003: The content item preparation platform sends a data stream of the video to the video playing terminal according to the connection.

After receiving the video on-demand request according to the connection, the content item preparation platform queries a data stream corresponding to the video, and sends the data stream of the video to the video playing terminal according to the connection. Generally, because there are much data stream content of the video, the content item preparation platform sends the data stream of the video to the video playing terminal in real time, that is, the video playing terminal plays the data stream of the downloaded video while downloading a subsequent data stream of the video from the content item preparation platform.

Optionally, the content item preparation platform queries, when sending a data stream of the video to the video playing terminal, a content item that is in the record and that is corresponding to a video frame in the data stream, and sends content item prompt information corresponding to the content item, where the content item prompt information includes at least the former one or both of the two of brief information of the queried content item and prompt enabling information that is used for reminding a user to enable the content item displaying client to obtain the content item. That is, when preparing to send the data stream of the video to the video playing terminal, the content item preparation platform first queries a content item corresponding to a video frame in the data stream, and then, when sending the data stream, sends the queried content item to the video playing terminal.

Optionally, when querying the content item corresponding to the video frame in the data stream, the content item preparation platform may query whether a content item with a marking moment between a playing start moment and a playing end moment of the data stream exists; and if exists, obtain the content item.

Optionally, the content item preparation platform may set a playing time period for each piece of content item prompt information based on a playing time of the data stream of the video, for example, determine, from the data stream, several continuous frames strongly related to the content of the content item, determine playing start moments of these frames as playing start moments of content item prompt information corresponding to the content item, and determine playing end moments of these frames as playing end moments of the content item prompt information.

Step 1004: The video playing terminal downloads the data stream of the video from the content item preparation platform according to the connection, and plays the video according to the data stream.

Optionally, when downloading the data stream, the video playing terminal may further download content item prompt information that is related to the data stream and that is provided by the content item preparation platform, and when playing the data stream, further play the content item prompt information corresponding to the data stream, so as to prompt the user the content item that may be provided currently. Optionally, the video playing terminal may further prompt the user to enable the content item displaying client. Therefore, as can be known, some on-demand requested videos do not involve a content item, and in this case, there is no content item prompt information. The user in this case may not enable the content item displaying client, but needs to enable the content item displaying client only when seeing the content item prompt information, so as to avoid long-time enabling of the user for the content item displaying client.

Optionally, the preparation platform may set a playing start moment and a playing end moment for the content item prompt information, and the video playing terminal may play the content item prompt information according to the playing start moment and the playing end moment of the content item prompt information.

Step 1005: A content item displaying client sends, to the content item preparation platform, a content item obtaining request used for requesting to obtain a content item related to a video that is being played by the video playing terminal.

Optionally, when the content item displaying client sends the content item obtaining request to the content item preparation platform, the content item obtaining request may carry a user account of the content item displaying client.

In an implementation scenario, when the user views that the content item displaying client displays that the video playing terminal bound with the content item displaying client is online, the "Watch While Play" control may be triggered. Still referring to FIG. 4C, in this case, the content item displaying client sends the content item obtaining request to the content item preparation platform.

Step 1006: When receiving the content item obtaining request, the content item preparation platform determines a current playing moment of the video played by the video playing terminal, and selects, from one or more content items corresponding to the video, a content item with a marking moment nearest to the current playing moment.

When receiving the content item obtaining request, the content item preparation platform may query, according to the user account of the content item displaying client that may be carried in the content item obtaining request, the video playing terminal bound with the content item displaying client, and may determine whether the video playing terminal is playing a video.

If the video playing terminal is playing a video, the content item preparation platform may determine, according to the data stream provided to the video playing terminal, a current playing moment of the video played by the video playing terminal, and select, from each content item corresponding to the video, a content item with a marking moment nearest to the current playing moment.

Obviously, for a content item with a marking moment nearest to the current playing moment, the marking moment may be a moment before the current playing moment, or may be a moment after the current playing moment.

Step 1007: The content item preparation platform pushes the selected content item to the content item displaying client.

Step 1008: The content item displaying client displays the received content item.

Optionally, the content item displaying client sends a query request to the content item preparation platform, where the query request is used for querying whether the video playing terminal bound with the content item displaying client is playing a video; the content item preparation platform receives a query request, to query whether the video playing terminal bound with the content item displaying client is playing a video, and send a query result to the content item displaying client; and the content item displaying client displays a playing status of the video playing terminal according to the query result.

Optionally, the content item displaying client receives a slide instruction acting on a content item display interface, and sequentially displays, according to a direction indicated by the slide instruction, content items of the video that exist on the content item display interface.

In an exemplary implementation manner, the content item displaying client may display obtained content items of a same video on a same content item display interface, so that the user may pull, by sliding up and down, a content item that exists below or above currently displayed content on the content item display interface. In another implementation manner, the content item displaying client may set a content item display interface for each content item, so that the user may pull, by sliding left and right, a content item display interface of a former page of the current content item display interface or a content item display interface of a next page of the content item display interface.

Optionally, the content item displaying client receives operation information on the displayed content item, and executes an operation corresponding to the operation information. For example, when the content item is a product advertisement, the user may select a purchase control displayed in the content item, and the content item displaying client may submit purchase information for purchasing the product to a product providing background. For example, when the content item is a topic voting, the user may select a control required for voting, and the content item displaying client may provide voting information selected by the user to a vote collection background.

In various embodiments, according to the method for displaying a content item provided in this embodiment of the present invention, a content item corresponding to a video is sent to a content item displaying client bound with a video playing terminal, thereby separating playing of the video from displaying of the content item, so that the content item displaying client displays the content item while the video playing terminal plays the video, thereby resolving the problem that because a content item is inserted into a video, playing of the content item needs to exclusively occupy a screen of a video playing terminal; consequently, a video that is being played must pause, which further affects a playing progress; and achieve effects of ensuring that the content item corresponding to the video is displayed while the video is played, and that impact of the content item for a video playing progress is avoided.

Figure 11:
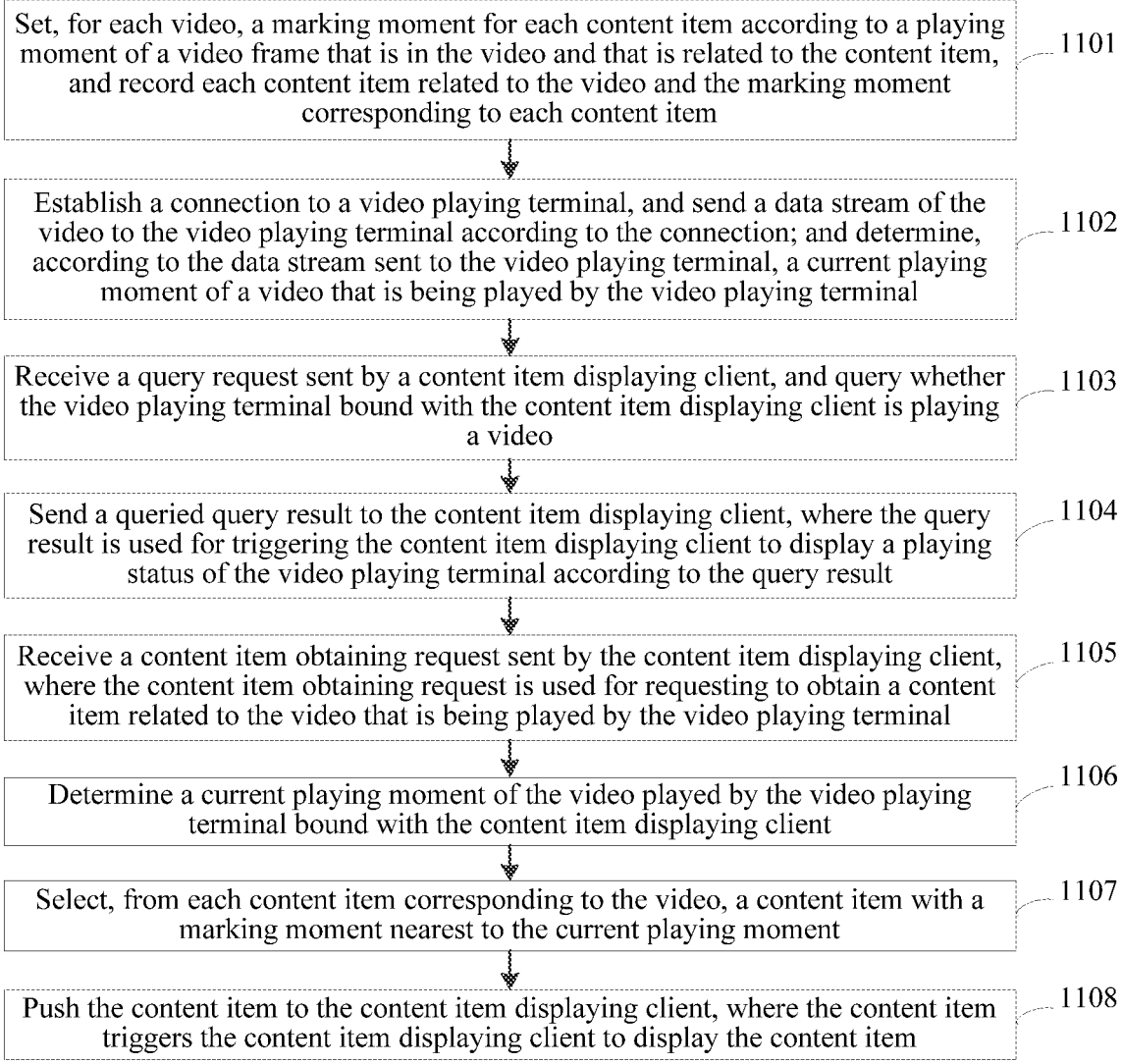
FIG. 11 is a flowchart of a method for displaying a content item according to still another embodiment of the present invention.

FIG. 11 shows a flowchart of a method for displaying a content item according to still another embodiment of the present invention. The method for displaying a content item is described by using an example of applying to the content item preparation platform 140 shown in FIG. 1. The method includes:

Step 1101: Set, for each video, a marking moment for each content item according to a playing moment of a video frame that is in the video and that is related to the content item, and record each content item related to the video and the marking moment corresponding to each content item.

That is, video frames strongly related to the content item are determined from the video, and a marking moment of the content item is set according to playing moments of these video frames, for example, a playing moment of any frame in these video frames may be determined as a marking moment of the content item.

Step 1102: Establish a connection to a video playing terminal, and send a data stream of the video to the video playing terminal according to the connection; and determine, according to the data stream sent to the video playing terminal, a current playing moment of a video that is being played by the video playing terminal.

Because the data stream obtained from the content item preparation platform by the video playing terminal in real time is a subsequent data stream that is being played and that is obtained from the content item preparation platform while being played by the video playing terminal, the content item preparation platform may deduce, according to the data stream that is being delivered to the video playing terminal, a current playing moment of a video that is being played by the video playing terminal, where the current playing moment is generally in a certain moment before a start moment of the data stream that is being delivered, and a moment between the current playing moment and the start moment of the data stream that is being delivered is less than a preset duration threshold.

Step 1103: Receive a query request sent by a content item displaying client, and query whether the video playing terminal bound with the content item displaying client is playing a video.

The query request is used for querying whether the video playing terminal bound with the content item displaying client is playing a video.

Optionally, the query request carries an identifier or a user account of the content item displaying client, where the identifier or the user account of the content item displaying client may uniformly identify the content item displaying client. The content item preparation platform may query, according to the identifier or the user account in the query request, the video playing terminal bound with the content item displaying client. Because when the video playing terminal is online, the video playing terminal needs to establish a connection to the content item preparation platform, the content item preparation platform may learn whether the video playing terminal bound with the content item displaying client is online, and because the video playing terminal downloads the data stream of the video from the content item preparation platform and plays the video, the content item preparation platform may determine, according to a downloading action of the video playing terminal, a video that is being played by the video playing terminal and a current playing moment of the played video.

Step 1104: Send a queried query result to the content item displaying client, where the query result is used for triggering the content item displaying client to display a playing status of the video playing terminal according to the query result.

Step 1105: Receive a content item obtaining request sent by the content item displaying client, where the content item obtaining request is used for requesting to obtain a content item related to the video that is being played by the video playing terminal.

Step 1106: Determine a current playing moment of the video played by the video playing terminal bound with the content item displaying client.

Step 1107: Select, from one or more content items corresponding to the video, a content item with a marking moment nearest to the current playing moment.

Step 1108: Push the content item to the content item displaying client, where the content item triggers the content item displaying client to display the content item.

Optionally, when a data stream of the video is sent to the video playing terminal, a content item that is in the record and that is corresponding to a video frame in the data stream is queried, content item prompt information corresponding to the content item is sent, where the content item prompt information is used for triggering the video playing terminal to receive the data stream and the content item prompt information that are sent by the content item preparation platform, and when the data stream is played, the content item prompt information corresponding to the data stream is played.

The content item prompt information at least includes the former one or both of the two of brief information of the queried content item and prompt enabling information that is used for reminding a user to enable the content item displaying client to obtain the content item.

In various embodiments, according to the method for displaying a content item provided in this embodiment of the present invention, a content item corresponding to a video is sent to a content item displaying client bound with a video playing terminal, thereby separating playing of the video from displaying of the content item, so that the content item displaying client displays the content item while the video playing terminal plays the video, thereby resolving the problem that because a content item is inserted into a video, playing of the content item needs to exclusively occupy a screen of a video playing terminal; consequently, a video that is being played must pause, which further affects a playing progress; and achieve effects of ensuring that the content item corresponding to the video is displayed while the video is played, and that impact of the content item for a video playing progress is avoided.

Figure 12:
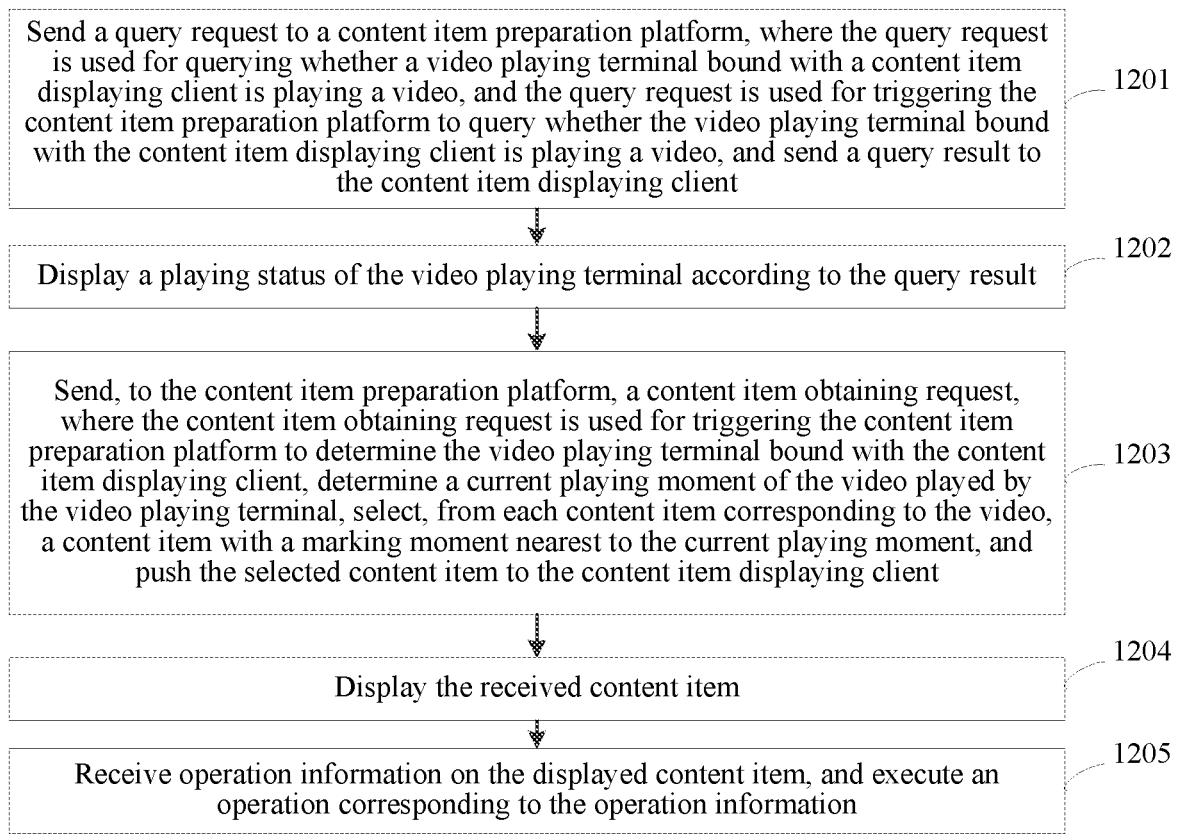
FIG. 12 is a flowchart of a method for displaying a content item according to yet another embodiment of the present invention.

FIG. 12 shows a flowchart of a method for displaying a content item according to yet another embodiment of the present invention. The method for displaying a content item is described by using an example of applying to the content item displaying client 120 shown in FIG. 1. The method includes:

Step 1201: Send a query request to a content item preparation platform, where the query request is used for querying whether a video playing terminal bound with a content item displaying client is playing a video, and the query request is used for triggering the content item preparation platform to query whether the video playing terminal bound with the content item displaying client is playing a video, and send a query result to the content item displaying client.

Step 1202: Display a playing status of the video playing terminal according to the query result.

Step 1203: Send, to the content item preparation platform, a content item obtaining request used for requesting to obtain a content item related to a video that is being played by a video playing terminal, where the content item obtaining request is used for triggering the content item preparation platform to determine the video playing terminal bound with the content item displaying client, determine a current playing moment of the video played by the video playing terminal, select, from one or more content items corresponding to the video, a content item with a marking moment nearest to the current playing moment, and push the selected content item to the content item displaying client.

Step 1204: Display the received content item.

Step 1205: Receive operation information on the displayed content item, and execute an operation corresponding to the operation information.

Optionally, the content item displaying client receives a slide instruction acting on a content item display interface, and sequentially displays, according to a direction indicated by the slide instruction, content items of the video that exist on the content item display interface.

In an implementation manner, the content item displaying client may display obtained content items of a same video on a same content item display interface, so that a user may pull, by sliding up and down, a content item that exists below or above currently displayed content on the content item display interface. In another implementation manner, the content item displaying client may set a content item display interface for each content item, so that a user may pull, by sliding left and right, a content item display interface of a former page of the current content item display interface or a content item display interface of a next page of the content item display interface.

Optionally, the content item displaying client receives operation information on the displayed content item, and executing an operation corresponding to the operation information. For example, when the content item is a product advertisement, the user may select a purchase control displayed in the content item, and the content item displaying client may submit purchase information for purchasing the product to a product providing background. For another example, when the content item is a topic voting, the user may select a control required for voting, and the content item displaying client may provide voting information selected by the user to a vote collection background.

In various embodiments, according to the method for displaying a content item provided in this embodiment of the present invention, a content item corresponding to a video played by a video playing terminal bound with a content item displaying client is received, thereby separating playing of the video from displaying of the content item, so that the content item displaying client displays the content item while the video playing terminal plays the video, thereby resolving the problem that because a content item is inserted into a video, playing of the content item needs to exclusively occupy a screen of a video playing terminal; consequently, a video that is being played must pause, which further affects a playing progress; and achieve effects of ensuring that a content item corresponding to the video is displayed while the video is played, and that impact of the content item for a video playing progress is avoided.

It should be noted that: in the apparatus and device for displaying a content item and the method for displaying a content item that are provided in the foregoing embodiment, when a content item is displayed, only divisions of the foregoing functional modules are described by using an example. In actual application, the foregoing functions may be completed by allocating to different functional modules according to a need, that is, internal structures of the content item preparation platform and the content item displaying client are divided into different functional modules, to complete all or a part of the foregoing described functions. In addition, the apparatus and the device for displaying a content item provided in the foregoing embodiment and the embodiment of the method for displaying a content item belong to the same idea. For specific implementation processes thereof, refer to the method embodiments, and details are not further described herein.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A content item preparation platform, comprising:
one or more processors; and
a memory;
the memory storing one or more programs, the one or more programs being configured to be executed by the one or more processors, and the one or more programs comprising instructions used for performing:

receiving a content item obtaining request sent by a content item displaying client executed on a mobile terminal, the content item obtaining request being used for requesting to obtain a content item related to a video being displayed to a user by a video displaying terminal;

determining a current playing moment of the video being displayed to the user by the video displaying terminal, wherein a binding relationship have been established between the video displaying terminal and the content item displaying client of the mobile terminal, and is recorded by the content item preparation platform;

selecting, from one or more content item corresponding to the video, a content item with a marking moment nearest to the current playing moment;

pushing the selected content item to the content item displaying client, the content item triggering the content item displaying client to display the content item to the user; and receiving an operation information on the displayed content item, and executing an operation corresponding to the operation information, the operation information including an entry trigger about at least one of a purchase, a voting option, an information retrieval, or an incentive reception, the operation corresponding to the operation information including processing the entry trigger and displaying a result page corresponding to the entry trigger;

wherein the content item displaying client comprises an application (APP) provided by the content item preparation platform to run on the mobile terminal used by the user, and the APP provided by the content item preparation platform obtains the content item corresponding to the video being displayed to the user by the video displaying terminal.

2. The content item preparation platform according to claim 1, the one or more programs further comprising instructions used for performing:

setting, for each video, based on input from a management user of the content preparation platform, a marking moment for each content item according to a playing moment of a video frame that is in the video and that is related to the content item, and recording each content item related to the video and the marking moment corresponding to each content item.

3. The content item preparation platform according to claim 1, the one or more programs further comprising instructions used for performing:

querying, according to a data stream of the video being sent to the video displaying terminal, a content item corresponding to a video frame in the data stream, and sending content item prompt information corresponding to the content item.

4. The content item preparation platform according to claim 1, the one or more programs further comprising instructions used for performing:

querying, when sending a data stream of the video to the video displaying terminal, a content item corresponding to a video frame in the data stream, adding content item prompt information of the content item to the corresponding video frame in the data stream, and sending the data stream added with the content item prompt information to the video displaying terminal;

the content item prompt information comprising at least the former one or both of:

brief information of the queried content item, and prompt enabling information that is used for prompting to enable the content item displaying client to obtain the content item.

5. The content item preparation platform according to claim 1, the one or more programs further comprising instructions used for performing:

establishing a connection to the video displaying terminal, and sending a data stream of the video to the video displaying terminal according to the connection; and determining, according to the data stream sent to the video displaying terminal, the current playing moment of the video being displayed by the video displaying terminal.

6. The content item preparation platform according to claim 1, the one or more programs further comprising instructions used for performing:

in response to a query request sent by the content item displaying client, sending a feedback query result to the content item displaying client, the feedback query result being a playing status of the video displaying terminal.

7. The content item preparation platform according to claim 1, wherein the video displaying terminal comprises a television having a network video on-demand request function.

8. A method for displaying a content item, applied to a content item preparation platform, comprising:

receiving a content item obtaining request sent by a content item displaying client, the content item obtaining request being used for requesting to obtain a content item related to a video being displayed by a video displaying terminal;

determining a current playing moment of the video being displayed by the video displaying terminal, wherein a binding relationship have been established between the video displaying terminal and the content item displaying client of the mobile terminal, and is recorded by the content item preparation platform;

selecting, from one or more content item corresponding to the video, a content item with a marking moment nearest to the current playing moment;

pushing the selected content item to the content item displaying client, the content item triggering the content item displaying client to display the content item; and receiving an operation information on the displayed content item, and executing an operation corresponding to the operation information, the operation information including an entry trigger about at least one of a purchase, a voting option, an information retrieval, or an incentive reception, the operation corresponding to the operation information including processing the entry trigger and displaying a result page corresponding to the entry trigger;

wherein the content item displaying client comprises an application (APP) provided by the content item preparation platform to run on the mobile terminal used by the user, and the APP provided by the content item preparation platform obtains the content item corresponding to the video being displayed to the user by the video displaying terminal.

9. The method according to claim 8, further comprising:

setting, for each video, based on input from a management user of the content preparation platform, a marking moment for each content item according to a playing moment of a video frame that is in the video and that is related to the content item, and recording each content item related to the video and the marking moment corresponding to each content item.

10. The method according to claim 8, further comprising:
querying, when sending a data stream of the video to the video displaying terminal, a content item corresponding to a video frame in the data stream, and sending content item prompt information corresponding to the content item, the content item prompt information being used for triggering the video displaying terminal to: receive the data stream and the content item prompt information sent by the content item preparation platform, and when playing the data stream, play the content item prompt information corresponding to the data stream;
the content item prompt information comprising at least the former one or both of:
brief information of the queried content item and prompt enabling information that is used for prompting to enable the content item displaying client to obtain the content item.

11. The method according to claim 8, further comprising:
querying, according to a data stream of the video being sent to the video displaying terminal, a content item corresponding to a video frame in the data stream, and adding content item prompt information of the content item to the corresponding video frame in the data stream.

12. The method according to claim 8, further comprising:
establishing a connection to the video displaying terminal, and sending a data stream of the video to the video displaying terminal according to the connection; and
determining, according to the data stream sent to the video displaying terminal, the current playing moment of the video being displayed by the video displaying terminal.

13. The method according to claim 8, further comprising:
receiving a query request sent by the content item displaying client, and querying whether the video displaying terminal bound with the content item displaying client is playing a video; and
sending a queried query result to the content item displaying client, the query result being used for triggering the content item displaying client to display a playing status of the video displaying terminal according to the query result;
the query request being used for querying whether the video displaying terminal bound with the content item displaying client is playing a video.

14. A content item displaying client executed on a mobile terminal, the content item displaying client comprising:
one or more processors; and
a memory;
the memory storing one or more programs, the one or more programs being configured to be executed by the one or more processors, and the one or more programs comprising instructions used for performing:
sending, to a content item preparation platform, a content item obtaining request used for requesting to obtain a content item related to a video being displayed by a video displaying terminal, the content item obtaining request being used for triggering the content item preparation platform to: determine the video displaying terminal bound with the content item displaying client; determine a current playing moment of the video being displayed by the video displaying terminal; select, from one or more content items corresponding to the video, a content item with a marking moment nearest to the current playing moment; and push the selected content item to the content item displaying client; and
displaying the received content item;
wherein the content item displaying client comprises an application (APP) provided by the content item preparation platform to run on the mobile terminal used by the user, and the APP provided by the content item preparation platform obtains the content item corresponding to the video being displayed to the user by the video displaying terminal,
wherein the one or more programs further comprises instructions used for performing:
receiving a slide instruction on a content item display interface; and
displaying, in an order according to a direction indicated by the slide instruction, received content items of the video on the content item display interface.

15. The content item displaying client according to claim 14, the one or more programs further comprising instructions used for performing:
sending a query request to the content item preparation platform, the query request being used for triggering the content item preparation platform to query whether the video displaying terminal is playing a video, and for triggering the content item preparation platform to send a query result to the content item displaying client; and
displaying a playing status of the video displaying terminal.

16. A method for displaying a content item, applied to a content item displaying client executed on a mobile terminal, comprising:
sending, to a content item preparation platform, a content item obtaining request used for requesting to obtain a content item related to a video being displayed by a video displaying terminal, the content item obtaining request being used for triggering the content item preparation platform to: determine the video displaying terminal bound with the content item displaying client, determine a current playing moment of the video being displayed by the video displaying terminal; select, from one or more content item corresponding to the video, a content item with a marking moment nearest to the current playing moment; and push the selected content item to the content item displaying client; and
displaying the received content item;
wherein the content item displaying client comprises an application (APP) provided by the content item preparation platform to run on the mobile terminal used by the user, and the APP provided by the content item preparation platform obtains the content item corresponding to the video being displayed to the user by the video displaying terminal,
wherein the method further comprises:
receiving a slide instruction on a content item display interface; and
displaying, in an order according to a direction indicated by the slide instruction, received content items of the video on the content item display interface.

17. The method according to claim 16, further comprising:
sending a query request to the content item preparation platform, the query request being used for triggering the content item preparation platform to: query whether the video displaying terminal is playing a video, and send a query result to the content item displaying client; and displaying a playing status of the video displaying terminal according to the query result.

* * * * *